(12) United States Patent
Nagai et al.

(10) Patent No.: US 7,091,887 B2
(45) Date of Patent: Aug. 15, 2006

(54) MODULATOR, MODULATION METHOD, AND METHOD OF MANUFACTURING AN OPTICAL RECORDABLE MEDIUM WITH ENHANCED SECURITY FOR CONFIDENTIAL INFORMATION

(75) Inventors: Yuji Nagai, Kawasaki (JP); Yutaka Kashihara, Chigasaki (JP); Tadashi Kojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/056,349

(22) Filed: Feb. 10, 2005

(65) Prior Publication Data

US 2005/0244003 A1 Nov. 3, 2005

(30) Foreign Application Priority Data

Apr. 28, 2004 (JP) ............................ P2004-134666
Jan. 26, 2005 (JP) ............................ P2005-018590

(51) Int. Cl.
*H03M 5/00* (2006.01)
*G11B 7/0045* (2006.01)

(52) U.S. Cl. ........................................ 341/58; 713/193

(58) Field of Classification Search .................. 341/58, 341/59; 713/193
See application file for complete search history.

(56) References Cited

U.S. PATENT DOCUMENTS

2003/0061500 A1* 3/2003 Mimura et al. ............. 713/193
2003/0070082 A1* 4/2003 Nimura et al. .............. 713/193
2004/0172549 A1* 9/2004 Kojima et al. .............. 713/193

FOREIGN PATENT DOCUMENTS

| JP | 11-238305 | 8/1999 |
| JP | 2000-003560 | 1/2000 |
| JP | 2003-109302 | 4/2003 |
| JP | 2003122637 | 4/2003 |

* cited by examiner

*Primary Examiner*—Peguy JeanPierre
(74) *Attorney, Agent, or Firm*—Foley & Lardner LLP

(57) ABSTRACT

A modulator includes a replacement processing unit which replaces a part of main information code-converted in a main information converter with specific information code-converted in a specific information converter and a direct-current component suppress processing unit which performs direct-current component suppress processing for the main information which has undergone the replacement processing in the replacement processing unit. The direct-current component suppress processing can be performed for the main information after the replacement processing of the main information with the specific information to prevent deterioration in direct-current component suppress characteristics due to the replacement processing.

17 Claims, 27 Drawing Sheets

| DATA WORD | STATE 0 | | STATE 1 | | STATE 2 | |
|---|---|---|---|---|---|---|
| | CODE WORD | NEXT STATE | CODE WORD | NEXT STATE | CODE WORD | NEXT STATE |
| 20 | 100001 00000* | 0 | 010101 00000* | 0 | 010101 00000* | 0 |
| 21 | 100001 00000# | 1 | 010101 00000# | 1 | 010101 00000# | 1 |
| 22 | 100001 000010 | 0 | 010101 000010 | 0 | 010101 000010 | 0 |

FIG.3A

| DATA | CODE |
|------|------|
| 11 | 00X |
| 10 | 010 |
| 01 | 10X |
| 0011 | 000 00X |
| 0010 | 000 010 |
| 0001 | 100 00X |
| 0000 | 100 010 |

X: INVERSION SIGNAL OF SUBSEQUENT CHANNEL BIT

| CHANNEL BIT BEFORE CONNECTION | CHANNEL BIT AFTER CONNECTION |
|------|------|
| 010 101 010 | 100 000 010 |

| Data word | Data word(A) | Data word(B) | Data word(C) | Data word(D) |
|---|---|---|---|---|

FIG.9A

| State control | | | | | |
|---|---|---|---|---|---|
| Channel Data 1 (MODULATED DATA) | Code A | Code B | Code C | Code D |
| | 12 channel bit | 12 channel bit | 12 channel bit | 12 channel bit |

| | CONNECTION SPECIFIC PATTERN | | CONNECTION SPECIFIC PATTERN | |

FIG.9B

| State control | | | | | |
|---|---|---|---|---|---|
| Channel Data 2 (MODULATED DATA) | Code A' | Code B' | Code C' | Code D' |
| | 12 channel bit | 12 channel bit | 12 channel bit | 12 channel bit |

| | CONNECTION SPECIFIC INVERSE PATTERN | | CONNECTION SPECIFIC INVERSE PATTERN | |

FIG.9C

| State control | | MM word → | MM | | |
|---|---|---|---|---|---|
| Channel Data 3 (MM EMBEDDED DATA) | Code A | Code MM | | Code D | |
| | 12 channel bit | 24 channel bit | | 12 channel bit | |

FIG.9D

| Data word | Data word(A) | Data word(B) | Data word(C) | Data word(D) |

FIG.10A

State control

| Channel Data 1 (MODULATED DATA) | Code A | Code B | Code C | Code D |
| --- | --- | --- | --- | --- |
| | 12 channel bit | 12 channel bit | 12 channel bit | 12 channel bit |

FIG.10B

State control          MM word → MM

| Channel Data 3 (MM EMBEDDED DATA) | Code A | Code MM | Code D |
| --- | --- | --- | --- |
| | 12 channel bit | 24 channel bit | 12 channel bit |

FIG.10C

| Data word | Data word(A) | Data word(B) | Data word(C) | Data word(D) |

FIG.11A

| State control | | | | | |
|---|---|---|---|---|---|
| Channel Data 1 (MODULATED DATA) | Code A | Code B | Code C | Code D |
| | 12 channel bit | 12 channel bit | 12 channel bit | 12 channel bit |

CONNECTION SPECIFIC PATTERN (under Code A – Code B)
CONNECTION SPECIFIC PATTERN (under Code C – Code D)

FIG.11B

| Channel Data 2 (MODULATED DATA) | Code A' | Code B' | Code C' | Code D' |
|---|---|---|---|---|
| | 12 channel bit | 12 channel bit | 12 channel bit | 12 channel bit |

FIG.11C

MM word → MM

| Channel Data 3 (MM EMBEDDED DATA) | Code A' | Code MM | Code D' |
|---|---|---|---|
| | 12 channel bit | 24 channel bit | 12 channel bit |

FIG.11D

| Data word | Data word(A) | Data word(B) | Data word(C) | Data word(D) |
|---|---|---|---|---|

FIG.16A

| State control | ⤵ | ⤵ | ⤵ | ⤵ | ⤵ |
|---|---|---|---|---|---|
| Channel Data 1 (MODULATED DATA) | Code A | Code B | Code C | Code D | |
| | 12 channel bit | 12 channel bit | 12 channel bit | 12 channel bit | |

CONNECTION SPECIFIC PATTERN | CONNECTION SPECIFIC PATTERN

FIG.16B

| State control | ⤵ | ⤵ | ⤵ | ⤵ | ⤵ |
|---|---|---|---|---|---|
| Channel Data 2 (MODULATED DATA) | Code A' | Code B' | Code C' | Code D' | |
| | 12 channel bit | 12 channel bit | 12 channel bit | 12 channel bit | |

CONNECTION SPECIFIC INVERSE PATTERN | CONNECTION SPECIFIC INVERSE PATTERN

FIG.16C

| Data word | Data word(A) | Data word(B) | Data word(C) | Data word(D) |
FIG. 17A
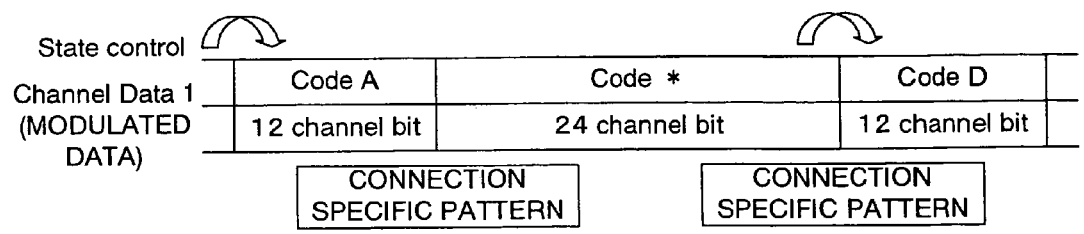
FIG. 17B
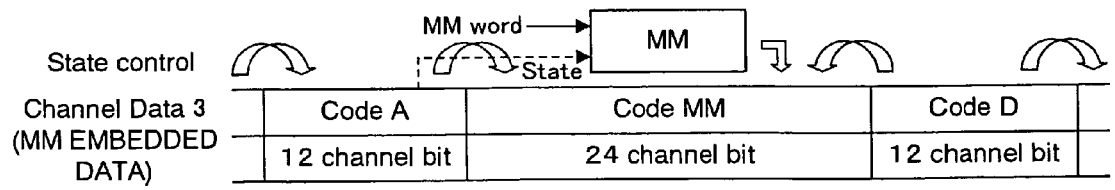
FIG. 17C

| Data word | Data word(A) | Data word(B) | Data word(C) | Data word(D) |

MODULATOR, MODULATION METHOD, AND METHOD OF MANUFACTURING AN OPTICAL RECORDABLE MEDIUM WITH ENHANCED SECURITY FOR CONFIDENTIAL INFORMATION

CROSS REFERENCE TO THE INVENTION

This application is based upon and claims the benefit of priority from the prior Japanese Patent Application No. 2004-134666, filed on Apr. 28, 2004 and the prior Japanese Patent Application No. 2005-18590, filed on Jan. 26, 2005; the entire contents of which are incorporated herein by reference.

BACKGROUND OF THE INVENTION

1. Field of the Invention

The present invention relates to a modulator which replaces a part of main information with specific information.

2. Description of the Related Art

In some cases, confidential information that is not intended for disclosure to users is recorded on a recording medium such as a CD (Compact Disk), a DVD (Digital Versatile Disk), and the like. For example, when various contents such as images, sounds, texts, and the like are encoded and recorded onto the recording medium, the encoded contents and an encryption key for decoding the contents as confidential information are recorded. This enables both reproduction of the contents and prevention of illegal copy thereof to thereby protect a copyrighted work contained in the contents.

Note that a technique of modulating a cryptographic key by a modulator different from a modulator for an information data block and recording it onto a recording medium is disclosed (see Japanese Patent Laid-open Application No. 2003-109302). Besides, a technique of converting first information K1 containing a component for decoding contents and second information containing a component for decoding the first information by conversion rules φ1 and φ2 respectively and recording them onto a recording medium is disclosed (see Japanese Patent Laid-open Application No. 2003-122637).

SUMMARY OF THE INVENTION

It is conceivable that main information and confidential information are modulated by a first and a second modulation method respectively to generate main information modulation signal and confidential information modulation signal, a part of the main information modulation signal is replaced with the confidential information modulation signal, and a resultant signal is recorded onto a recording medium. In short, an embedded signal in which the confidential information modulation signal is embedded in the main information modulation signal is recorded onto the recording medium.

In this technique, by demodulating the embedded signal by the first modulation method, the main information can be reproduced. Although a part of the main information modulation signal has been replaced with the confidential information modulation signal, error correction processing is performed for the embedded signal, whereby the main information before replacement with the confidential information can be reproduced. It is difficult to reproduce the confidential information unless the second modulation method is used, so that the secret state of the confidential information can be maintained.

However, when this technique is applied to, for example, a DVD, error propagation may occur in the main information. The portion in the main information replaced with the confidential information becomes an error in the main information, and an error may occur in the main information at portions other than this. This error propagation can be caused by modulation processing at a connection boundary between the main information and the confidential information. Besides, the embedding of the confidential information into the main information causes disturbance in direct-current component suppress processing performed for the main information, which may cause deterioration in direct-current component suppress characteristics.

As described above, the signal characteristics of the main information may deteriorate due to the embedding of the specific information such as confidential information and the like into the main information.

In view of the above situation, embodiments of the invention provide a modulator which reduces the deterioration in signal characteristics of the main information when embedding specific information such as confidential information and the like into the main information.

In accordance with an embodiment of the invention, a modulator is provided which includes: a main information converter configured to code-convert main information by a first modulation method; a specific information converter configured to code-convert specific information by a second modulation method different from the first modulation method; a replacement unit configured to replace a part of the code-converted main information with the code-converted specific information; and a direct-current component suppressing unit configured to suppress direct-current components of the replaced main information.

In accordance with other embodiments of the invention, there is provided a modulator which includes: a main information converter configured to code-convert main information by a first modulation method based on state information; a specific information converter configured to code-convert specific information by a second modulation method different from the first modulation method; a replacement processing unit configured to replace a part of the code-converted main information with the code-converted specific information and output the resultant information as a channel bit stream; a DSV controller configured to calculate a digital sum value of the channel bit stream; and a state register configured to output the state information in accordance with the replacement result and the calculated digital sum value.

In accordance with other embodiments of the invention, there is provided a modulator which includes: a main information converter configured to code-convert main information by a first modulation method; a specific information converter configured to code-convert specific information by a second modulation method different from the first modulation method; a replacement processing unit configured to replace a part of the code-converted main information with the code-converted specific information and output the resultant information as a channel bit stream; a DSV controller configured to calculate a digital sum value of the channel bit stream and to suppress direct-current components of the replaced main information.

In accordance with other embodiments of the invention, there is provided a modulator which includes: a main information converter configured to code-convert main information by a first modulation method based on state information; a specific information converter configured to code-convert specific information by a second modulation method different from the first modulation method based on state information; a replacement processing unit configured to replace a part of the code-converted main information with the code-converted specific information and output the resultant information as a channel bit stream; a converted information outputting unit configured to output at least one of the converted information selected from the code-converted main information the code-converted specific information in accordance with the replacement result of the replacement processing unit; a DSV controller configured to calculate a digital sum value of the channel bit stream; and a state register configured to output the state information in accordance with the output from the converted information outputting unit and the output from the DSV controller.

In accordance with yet other embodiments of the invention, there is provided a modulator which includes: a main information storing device storing a first main information conversion table showing main information data before code-conversion, next state information, and a first code after code-conversion based on state information and a second main information conversion table showing main information data before code-conversion, next state information, and a second code after code-conversion based on state information; a main information converter configured to code-convert main information based on said first and second main information conversion tables and output the code-converted main information by channel bits of predetermined length to first and second terminals respectively; a first DSV calculator configured to calculate first digital sum values of the code-converted main information outputted from the first terminals; a second DSV calculator configured to calculate second digital sum values of the code-converted main information outputted from the second terminals; a state information decision unit configured to decide state information to be used in said main information conversion table based on the first and second calculated digital sum values; an even/odd judging unit configured to judge whether the number of is in an area of the code-converted main information into which specific information is embedded is even or odd; a specific information converter configured to code-convert specific information by a second modulation method different from a first modulation method based on the result of the judgment by the even/odd judging unit; and a replacement unit configured to replace a part of the code-converted main information with the code-converted specific information and output the resultant information as a channel bit stream.

In accordance with other embodiments of the invention, there is provided a modulator which includes: a main information converter configured to code-convert main information by a first modulation method; a connection rule processing unit configured to generate a main information modulation signal from the code-converted main information based on a connection rule table showing combinations of adjacent channel bits before and after processing; a specific information converter configured to code-convert specific information by a second modulation method, different from the first modulation method, to generate a specific information modulation signal including a pattern that is not used in the first modulation method; and a replacement unit configured to replace a part of the generated main information modulation signal with the generated specific information modulation signal.

The generated specific information modulation signal may be divided into a plurality of parts (for example, a header part and an end part, or three or more parts), and one or more of the parts includes a pattern which is not used in the first modulation method.

The generated specific information modulation signal may be divided into a plurality of parts (for example, a header part and an end part, or three or more parts), and a combination of two or more of the parts includes a combination being not used by the connection rule processing unit.

The connection rule processing unit may generate a main information modulation signal with a run length limited to a predetermined range, and the pattern is a pattern having a run length exceeding the predetermined range.

In accordance with other embodiments of the invention, there is provided a modulation method which includes: storing a first main information conversion table storing main information data before code-conversion, next state information, and a first code after code-conversion based on state information and a second main information conversion table showing main information data before code-conversion, next state information, and a second code after code-conversion based on state information; code-converting main information based on said first and second main information conversion tables and outputting the code-converted main information by channel bits of predetermined length to first and second terminals respectively; calculating a first digital sum values of the code-converted main information outputted from the first terminal; calculating a second digital sum values of the code-converted main information outputted from the second terminal; determining state information to be used in said main information conversion table based on the first and second calculated digital sum values; judging whether the number of 1s in an area of the code-converted main information into which specific information is embedded is even or odd; code-converting specific information by a second modulation method different from a first modulation method based on the result of the judging; and replacing a part of the code-converted main information with the code-converted specific information and outputting the resultant information as a channel bit stream.

In accordance with other embodiments of the invention, there is provided a modulation method which includes: code-converting a main information by a first modulation method, said main information being constituted of channel bits of a predetermined length; generating a main information modulation signal from the code-converted main information based on a connection rule table showing combinations of adjacent channel bits before and after processing; code-converting specific information by a second modulation method, different from the first modulation method, to generate a specific information modulation signal including a pattern that is not used in the first modulation method; and replacing a part of the generated main information modulation signal with the generated specific information modulation signal.

In accordance with other embodiments of the invention, there is provided a method of manufacturing a master disk which includes: generating encoded contents data; generating encoded master key data used for decoding said encoded contents; generating main information including proprietary data; generating confidential information different from said proprietary data; code-converting said main information by a first modulation method; code-converting said specific information by a second modulation method different from the first modulation method; replacing a part of the code-converted main information with the code-converted specific information to output a channel bit stream; suppress direct-current components of the replaced main information; and embedding said encoded content, said encoded master key data, and said suppressed channel bit stream on a master recordable medium.

In accordance with other embodiments of the invention, there is provided a method of manufacturing a master disk which includes: generating encoded contents data; generating encoded master key data used for decoding said encoded contents; generating main information including proprietary data; generating confidential information different from said proprietary data; code-converting said main information by a first modulation method, said main information being constituted of channel bits; generating a main information modulation signal from the code-converted main information based on a connection rule table showing combinations of adjacent channel bits before and after processing; code-converting said specific information by a second modulation method, different from the first modulation method, to generate a specific information modulation signal including a pattern that is not used in the first modulation method; replacing a part of the generated main information modulation signal with the generated specific information modulation signal to generated encoded output data; and embedding said encoded content, said encoded master key data, and said encoded output data on a master recordable medium.

In accordance with other embodiments of the invention, there is provided a method of manufacturing an optical recordable medium which includes: generating encoded master key data; generating main information including proprietary data; generating confidential information different from said proprietary data; code-converting said main information by a first modulation method, said main information being constituted of channel bits; generating a main information modulation signal from the code-converted main information based on a connection rule table showing combinations of adjacent channel bits before and after processing; code-converting said specific information by a second modulation method, different from the first modulation method, to generate a specific information modulation signal including a pattern that is not used in the first modulation method; replacing a part of the generated main information modulation signal with the generated specific information modulation signal to generated encoded output data; and embedding said encoded master key data, and said encoded output data on said recordable medium.

In accordance with other embodiments of the invention, there is provided a modulator which includes: a main information converter configured to code-convert main information by a first modulation method; a specific information converter configured to code-convert specific information by a second modulation method different from the first modulation method; a direct-current component suppressing unit configured to suppress direct-current components of the code-converted main information; a replacement unit configured to replace a part of the suppressed code-converted main information with the code-converted specific information.

In accordance with other embodiments of the invention, there is provided a modulator which includes: a main information converter configured to code-convert main information by a first modulation method; a connection rule processing unit configured to generate a main information modulation signal from the code-converted main information based on a connection rule table showing combinations of adjacent channel bits before and after processing; a specific information converter configured to code-convert specific information by a second modulation method, different from the first modulation method, to generate a specific information modulation signal including a pattern that is not used in the first modulation method; a direct-current component suppressing unit configured to suppress direct-current components of the code-converted main information; a replacement unit configured to replace a part of the suppressed code-converted generated main information modulation signal with the generated specific information modulation signal.

BRIEF DESCRIPTION OF THE DRAWINGS

FIG. 1 is a diagram representing a disk recording device according to a first embodiment of the present invention.

FIG. 3A is a view showing an example of a code conversion table used in conversion in a code table unit.

FIGS. 9A to 9D are schematic views representing data streams shifting when modulation is performed using the modulator shown in FIG. 2.

FIGS. 10A to 10C are schematic views representing data streams shifting when no connection rule processing is performed and representing a comparative example of FIGS. 9A to 9D.

FIGS. 11A to 11D are schematic views representing data streams shifting when connection rule processing is performed and representing a comparative example of FIGS. 9A to 9D.

FIGS. 16A to 16E are schematic views representing data streams changed in modulation processing according to Modification Example 1 of the present invention.

FIGS. 17A to 17C are schematic views representing data streams changed in modulation processing according to Modification Example 2 of the present invention.

DESCRIPTION OF THE EMBODIMENTS

Figure 7:
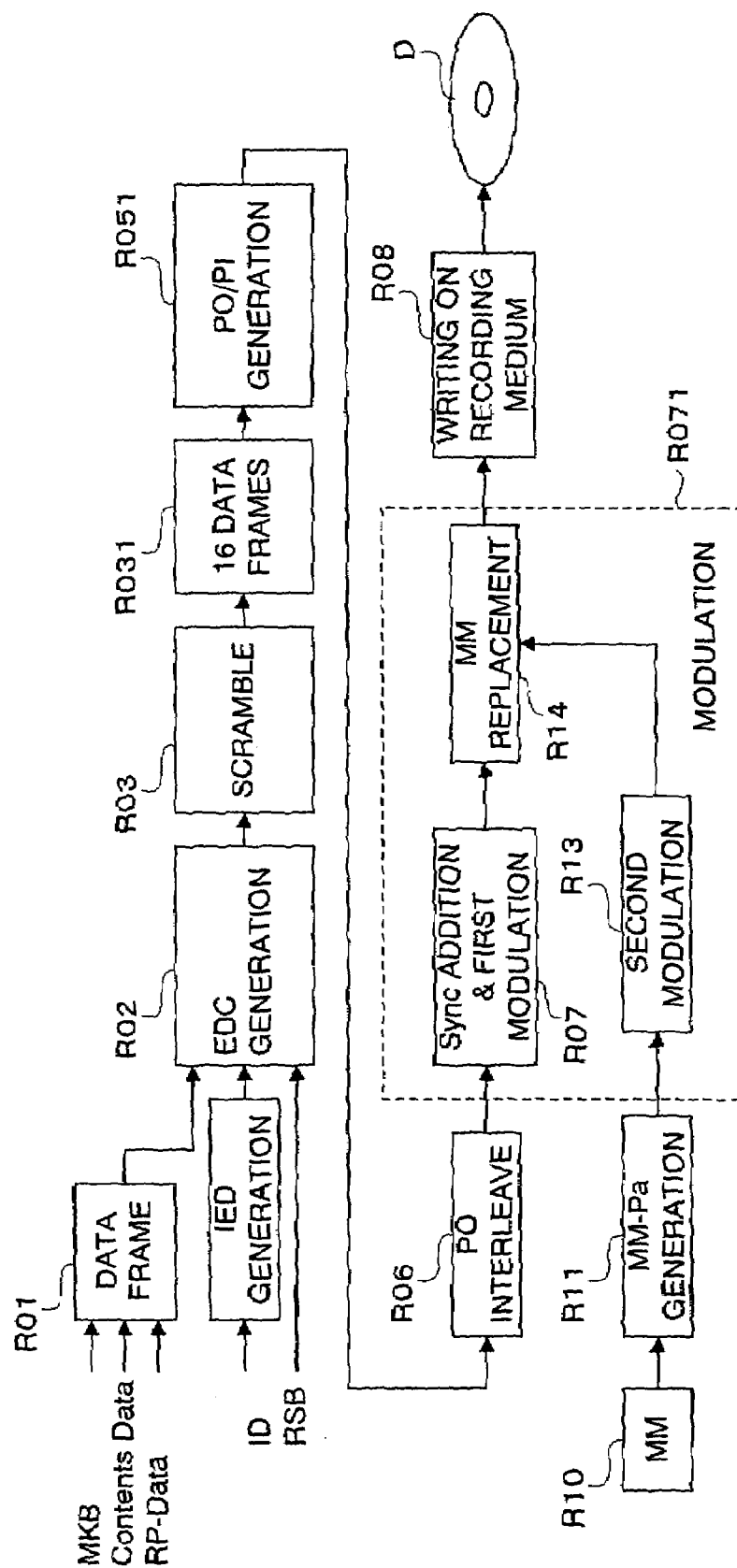
FIG. 7 is a diagram illustrating details of an internal configuration of the modulator shown in FIG. 1 and representing a comparative example corresponding to FIG. 2.

Hereinafter, embodiments of the present invention will be described in detail with reference to the drawings.

First Embodiment

FIG. 1 is a diagram representing a disk recording device according to a first embodiment of the present invention.

Here, writing to a recording medium D is performed with amediamark (MM) that is confidential information (a kind of specific information) being embedded in main information such as contents data, a media key block (MKB), and proprietary data (RP-Data).

The contents data is data representing images, sounds and so on. Since this contents data is encoded and then written to the recording medium D, the data is typically in the form of encoded contents (Enc-contents) which have been encoded before inputted into the device shown in FIG. 1. In this drawing, it is not necessary to distinguish contents before encoding (plain text) from the encoded contents, and the encoded contents are therefore referred to simply as contents data.

All of the media key block (MKB), the proprietary data (RP-Data), and the media mark (MM) are information for protecting the contents data.

The media key block (MKB) and the media mark (MM) are elements of an encryption key for decoding the encoded contents.

This proprietary data (RP-Data) is data to be a subject of ownership of a copyright, a trademark, a well-known name, or the like. When the proprietary data (RP-Data) is data having a characteristic of copyrighted work, such as data or the like of images and sounds, it becomes a subject of copyright. Further, when the proprietary data (RP-Data) exhibits a function of trademark, it can be a subject of trademark. One case of exhibiting the function of trademark is that a design of the trademark is reproduced when an optical disk 10 is set in a disk drive (reproducing device). This is because the proprietary data will be recognized as a trademark by a customer as a result of performing demonstration in a sales shop for example.

Here, the media key block (MKB) and the proprietary data (RP-Data) are regarded as the main information and the media mark (MM) is regarded as the confidential information, but this division is not absolute in a sense and a division different therefrom is also possible. What is processed with the contents data is regarded as the main information, and information to be embedded in the main information is regarded as the confidential information (a kind of specific information).

The main information (MKB, Contents Data, RP-Date) is inputted into a data frame generator R01 and arranged in a data frame structure constituted of a 2K-byte data packet. In parallel to this, an ID error detection code (IED) is added to a sector identifier (ID: Sector-ID) which corresponds to each data frame. The data frame generated in the data frame generator R01 is inputted into an EDC generator R02 where the sector identifier (ID) and auxiliary data (RSB) are added to the data frame and an error detection code (EDC) is generated and added to the data frame (see FIG. 12 described later).

The data frame outputted from the EDC generator R02 is inputted into a scramble unit R03 where a scramble signal is super imposed on the main information in the data frame. This scramble signal is typically decided based on a part of data of the sector identifier (ID). The data frame after undergoing the scramble processing is inputted into an ECC block generator R031 where 16 sets of the data frames create an ECC block. The ECC block is inputted into a PO/PI generator R051 where an error correcting outer parity PO and inner parity PI are generated and added to the ECC block (see FIG. 13 described later).

The ECC block outputted from the PO/PI generator R051 is inputted into a PO interleave unit R06 where the error correcting outer parity PO in the ECC block is dispersed (see FIG. 14 described later). As a result, the ECC block includes recording sectors to which the error correcting outer parity PO row are dispersed and the error correcting inner parity PI are added. These recording sectors are modulated and have synchronization signals added thereto in a synchronization signal addition & first modulator R07.

The media mark (MM) is given a media mark parity (MM-Pa) to become a correcting code added media mark (MM+MM-Pa) in a media mark parity generator R11 and modulated in a second modulator R13.

The modulated recording sector and modulated media mark are inputted into a media mark (MM) replacing unit R14 where a part of a main information modulation signal in the recording sector is replaced with a media mark modulation signal to generate a recording signal (see FIG. 15 described later). This recording signal is written to the recording medium D by a recording medium writing unit R08.

These synchronization signal (Sync) addition & first modulator R07, second modulator R13, and media mark (MM) replacing unit R14 modulate the main information and embed the confidential information, and therefore all of these are regarded as a modulator R071.

Figure 2:
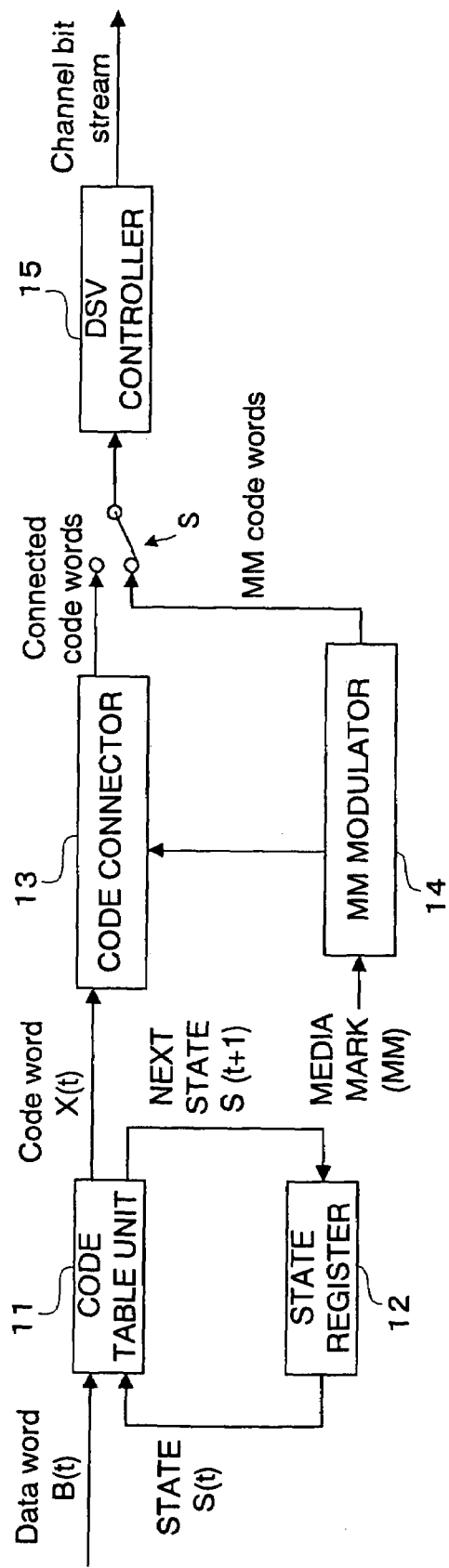
FIG. 2 is a block diagram representing details of an internal configuration of a modulator shown in FIG. 1.

FIG. 2 is a block diagram representing details of an internal configuration of the modulator R071 shown in FIG. 1. However, a part on the synchronization signal addition is omitted. The code table unit 11, a state register 12, and a code connector 13 in this drawing correspond to the first modulator R07 in FIG. 1, a media mark modulator 14 in this drawing corresponds to the second modulator R13, and a switch S and a DSV controller 15 in this drawing correspond to the media mark (MM) replacing unit R14, respectively. Alternatively, the switch S may be considered as corresponding to he replacing unit R14 with the DSV controller 15 as an added component of modulator R071. Further, the code table unit 11 and code connector 13 may be considered as constituting the first modulator R07 with the state register 12 as an added component of. the modulator.

The main information is inputted into the code table unit 11 as a data word B(t) and code-converted into a conversion code (code word) X(t). The code table unit 11, is stored in a memory or storage device which is accessed for code conversion. The code table 11, in which a plurality of states are prepared for one data word, is used to perform code-conversion based on a state selected by a selection signal from the state register. In this drawing, the code table unit 11 selects a state S(t) corresponding to the data word B(t) and outputs instruction data for a next state S(t+1).

The instruction signal for the next state S(t+1) is stored in the state register 12 and used for selection for a state of a next conversion code (Data word) B(t+1).

The conversion code X(t) outputted from the code table unit 11 is sent to the code connector 13 and subjected to processing under a conversion symbol connection rule so as to be converted into connected code words. When a specific pattern occurs in a connection part between symbols, the code connector 13 converts the conversion code into another pattern. As a result of this, conversion codes of data words (symbols) are connected to thereby prevent occurrence of a rule violation.

The media mark modulator 14 being the confidential information modulator code-converts the media mark (MM) to generate a media mark word (MM Code Word). This conversion is based on a conversion rule different from that for the main information.

The switch S switches between the connected code words (main information) and the media mark conversion code (confidential information) as the signal to be inputted into the DSV controller 15 to thereby replace a part of the main information with the confidential information. In other words, the confidential information is embedded in the main information.

The DSV controller 15 inverts a part of bit information of the signal inputted thereinto to control such that the direct-current component in the NRZI signal being a recording signal alternates near "0". Since the direct-current component of the signal is represented by a digital sum value (DSV), the DSV controller 15 inverts a part of bits of the connected code words such that the digital sum value (DSV) in a predetermined time becomes close to 0 to thereby perform DC component suppress control (DCC).

As the switch S is located before the DSV controller 15, the DC component suppress control is therefore performed on a signal with a media mark signal (MM) incorporated therein (a signal with confidential information embedded therein). As a result, the embedding of the confidential information does not disturb the DC component suppress control. Note that this will be detailed later.

A control signal is sent from the media mark modulator 14 to the code connector 13 to stop the connection rule processing within an area into which the media mark signal (MM) is to be incorporated. As the confidential information is embedded after the connection rule processing, an error occurring at portions other than the embedded (replaced) portion can be prevented. Note that this will be detailed later.

FIG. 3A is a view showing an example of a code conversion table used in conversion in the code table unit 11. This drawing shows a part of the code conversion table for code-converting the data word (symbol data) of 8 bits each into a code word of 12 channel bits. Each data word is converted into three kinds of code words in accordance with states 0 to 2. A next-state is determined in correspondence with the data word to be converted.

Here, "★" is determined in relation with a RLL (Run Length Limited Code). The RLL code is a modulation code of which maximum value and minimum value of continuing 0s are limited, such that, for example, (2,7)RLL means that 0 is permitted to continue from a minimum of 2 times to a maximum of 7 times.

"#" means that it is determined to be either 0 or 1 so that the DSV becomes close to 0 by the DSV controller 15.

Figure 3B:
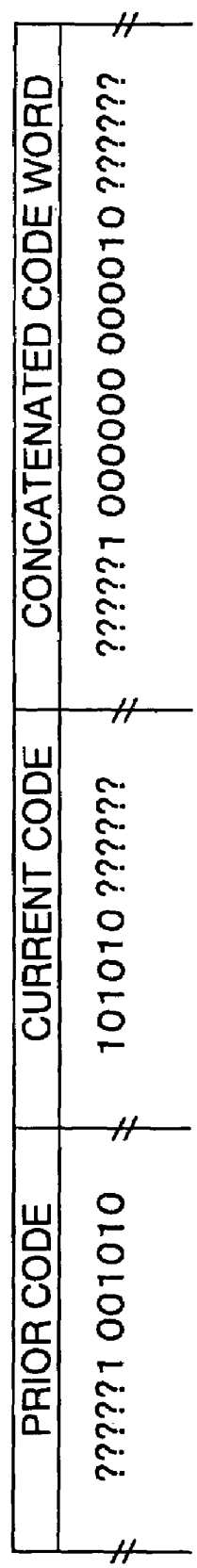
FIG. 3B is a view showing an example of a connection conversion table used in processing in a code connector.

FIG. 3B is a view showing an example of a connection conversion table used in processing by the code connector 13.

Further, in one example of the connection rule processing, when two consecutive code words (Previous Code Word and Current Code Word) are the designated pattern, they are converted into a concatenated code word. Here, "?" means that the values are kept as they are before and after the connection rule processing.

Figures 4A, 4B, 5:
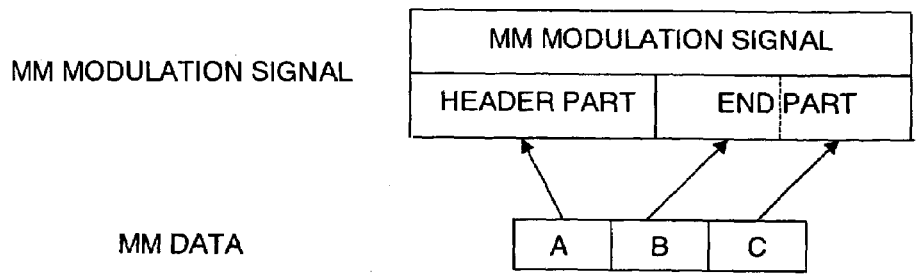
FIG. 4A is a view showing another example of the code conversion table used in conversion in the code table unit.
FIG. 4B is a view showing another example of the connection conversion table used in processing in the code connector.
FIG. 5 is a schematic view for explaining a configuration example of a media mark modulation signal.

FIG. 4A and FIG. 4B are views showing another example of the code conversion table used in conversion by the code table unit 11 and the connection conversion table used in processing by the code connector 13, respectively. A case shown here is that the code word after conversion is basically decided in accordance with the data word and therefore the conversion code is state-independent. After the modulation with a (1,7)RLL code in the code table unit 11, the connection rule processing in the code connector 13 is performed.

FIG. 4A shows a part of the code conversion table for code-converting the data word (symbol data) of 2 bits each into a codeword of 12 channel bits. Essentially, the 2-bit data word (Source data) is converted into a 3-bit code word. However, in the case of a data word of "00", a 4-bit data word constituted by adding next two bits to the data word is converted into a 6-channel code word. "X" in this drawing means an inversion signal of a bit subsequent thereto. In other words, "X" becomes "1" if the next bit is "0", or becomes "0" if the next bit is "1".

FIG. 4B is a view showing another example of the connection conversion table used in processing in the code connector 13.

The bit stream "100110" is code-converted according to the code conversion table shown in FIG. 4A to result in "010 101 010" in which "01" is repeated. This signal is a minimum run length in the (1,7)RLL and becomes difficult to read if this is written to a recording medium as it is. Therefore, the connection rule processing is performed using the connection conversion table shown in FIG. 4B to prevent the repetition of "01" to facilitate reading of this signal from the recording medium on which it is recorded.

FIG. 5 is a schematic view for explaining a configuration example of the media mark modulation (MM Modulation) signal.

Under consideration of the RLL rule, patterns usable with the code word (channel bit) after conversion are limited. Therefore, when the data word (symbol data) is converted into the code word (channel bit), most of the bit patterns may be used. In other words, most of the conversion patterns of the main information are used, and it becomes difficult to use the rest of the conversion patterns for the main information for code conversion for the media mark (confidential information). This is because, to maintain the confidentiality of the media mark signal it is necessary to prevent the original media mark signal from being reproduced when a media mark modulation signal made by modulating the media mark signal is inversely converted by a code conversion method similar to that for the main information (demodulation for the main information).

The channel bit length of the media mark signal can be made longer than the channel bit length of the main information to thereby easily differ the modulation pattern for the media mark signal from the modulation pattern for the main information. More specifically, by increasing the channel bit length of the media mark signal, it becomes possible to incorporate a pattern not in use for the main information channel bit pattern into a part of the channel bits and give a code converting function to the other part. For example, the channel bit length of the media mark signal is made twice the channel bit length of the main information, and a code conversion table for the media mark signal is created.

In FIG. 5, the media mark modulation signal is divided into channel bits [A], [B], and [C]. The channel bit [A] constitutes a header part of the media mark modulation signal, and the channel bits [B] and [C] constitute an end part of the media mark modulation signal.

Into this header part, a bit pattern not in use in the modulation channel bit pattern for the main information is incorporated. Into the end part, a bit pattern obtained by converting the media mark signal is incorporated. This arrangement makes it possible to prevent the original media mark signal from being reproduced even if the media mark modulation signal is inversely converted by the conversion method for the main information, so that the confidentiality of the media mark modulation signal can be maintained. It is possible to use, for the bit pattern for the end part in this event, the media mark signal converted by the conversion rule similar to that for the main information.

It should be noted that the channel bits [B] and [C] may constitute a middle part and an end part of the media mark modulation signal, respectively. In this case, a bit pattern that is not in use in the conversion channel bit pattern for the main information can be constituted by combination of the header part and the end part, and the bit pattern obtained by converting the media mark signal can be incorporated into the middle part.

Figure 6:
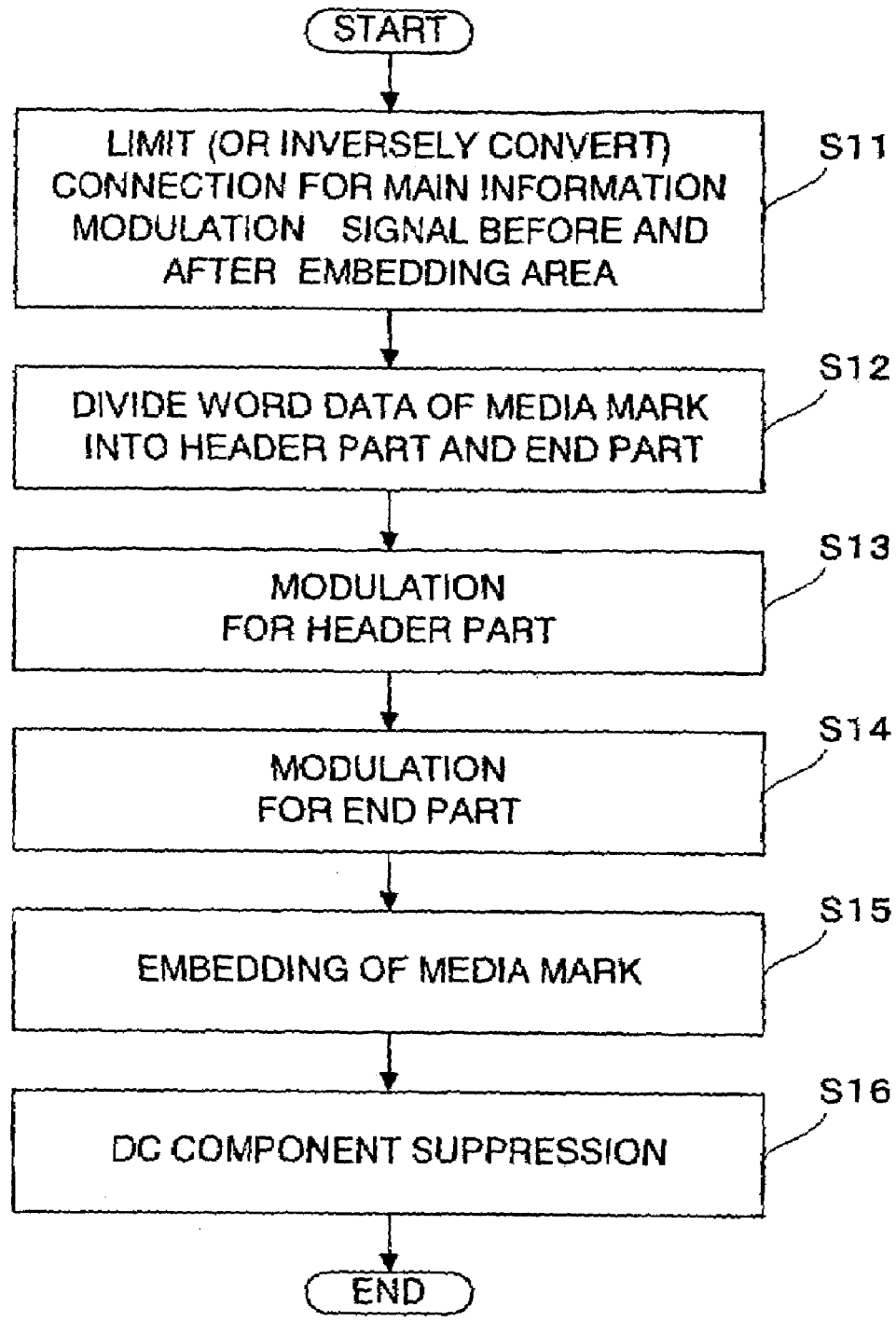
FIG. 6 is a flowchart illustrating a procedure of embedding a media mark modulation signal into a main information modulation signal.
Figure 7:
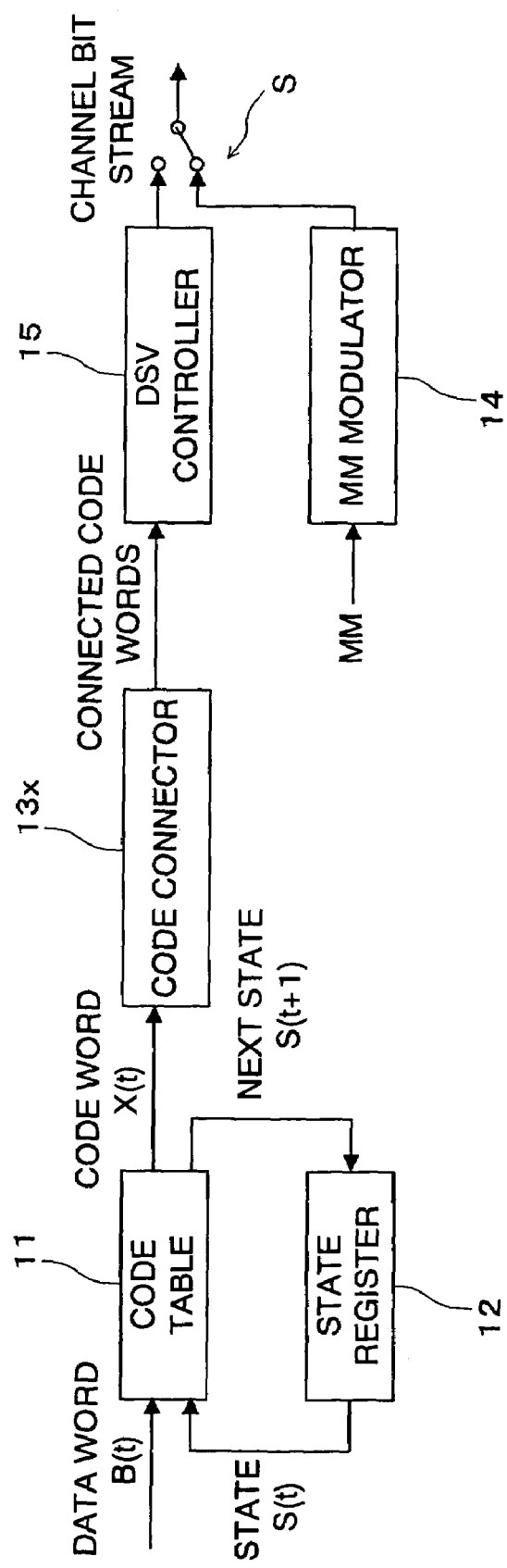

FIG. 6 is a flowchart illustrating a procedure of embedding a media mark modulation signal into a main information modulation signal.

The connection rule processing for the main information modulation signal adjacent to the embedding position of the media mark modulation signal in the main information modulation signal is limited (Step S11). As described above, this limitation is implemented by inputting the control information from the media mark modulator 14 to the code connector 13 in FIG. 2. Note that the code connection processing which has been once performed may be inversely converted into the original state in place of the limitation on this code connection processing. Not that an example of performing such inverse conversion will be described later.

The media mark modulation signal is divided into the header part and the end part (Step S12).

The header part and the end part of the media mark modulation signal are modulated (Steps S13, S14).

The media mark modulation signal is embedded (Step S15). A part of the main information modulation signal is replaced with the header part and the end part of the media mark modulation signal by switching the switch S at a timing of the header part of the media mark modulation signal, and the resultant signal is inputted into the DSV controller 15. Thereafter, the switch S is returned to the main information modulation signal side, where by the main information modulation signal is inputted into the DSV controller 15.

The main information modulation signal with the media mark modulation signal embedded therein is inputted into the DSV controller 15, whereby the DC component is suppressed (Step S16).

The modulation of the media mark signal can be performed in the following manner. The bit pattern of the header part of the media mark modulation signal is decided by the media mark signal A before modulation and the main information modulation signal immediately before this header part. The bit pattern of the end part of the media mark modulation signal is decided by the other media mark signals B and C, the header part of the media mark modulation signal before this end part, and the main information modulation signal immediately after this end part.

This means the code connection processing takes place in the area into which the media mark signal is embedded. In this code connection processing, the main information modulation signal can be a bit pattern unchanged from that before the embedding. Instead of this, the media mark modulation signal and the main information modulation signal adjacent thereto may be converted together. This conversion facilitates adoption to the RLL rule or the like. Note that this will be detailed later.

COMPARATIVE EXAMPLE

FIG. 7 is a diagram illustrating details of an internal configuration of the modulator R071 shown in FIG. 1 and representing a comparative example corresponding to FIG. 2. A main information modulation signal is subjected to modulation and DC component suppress processing by a code table unit 11, a code connector 13x, and a DSV controller 15 to generate a main information modulation signal. This main information modulation signal and a media mark modulation signal are switched by a switch S and outputted, whereby a main information modulation signal with the media mark modulation signal embedded therein is generated. Note that the code conversion table and the connection conversion table in FIGS. 3A and 3B are used in this event.

In this method, replacement of a part of the main information modulation signal with the media mark modulation signal after the connection rule processing may cause not only this replaced part but also the main information adjacent to the replaced part to be an error (occurrence of error propagation). Further, the modulated signal may decrease in direct-current component suppressing characteristics.

Figure 8:
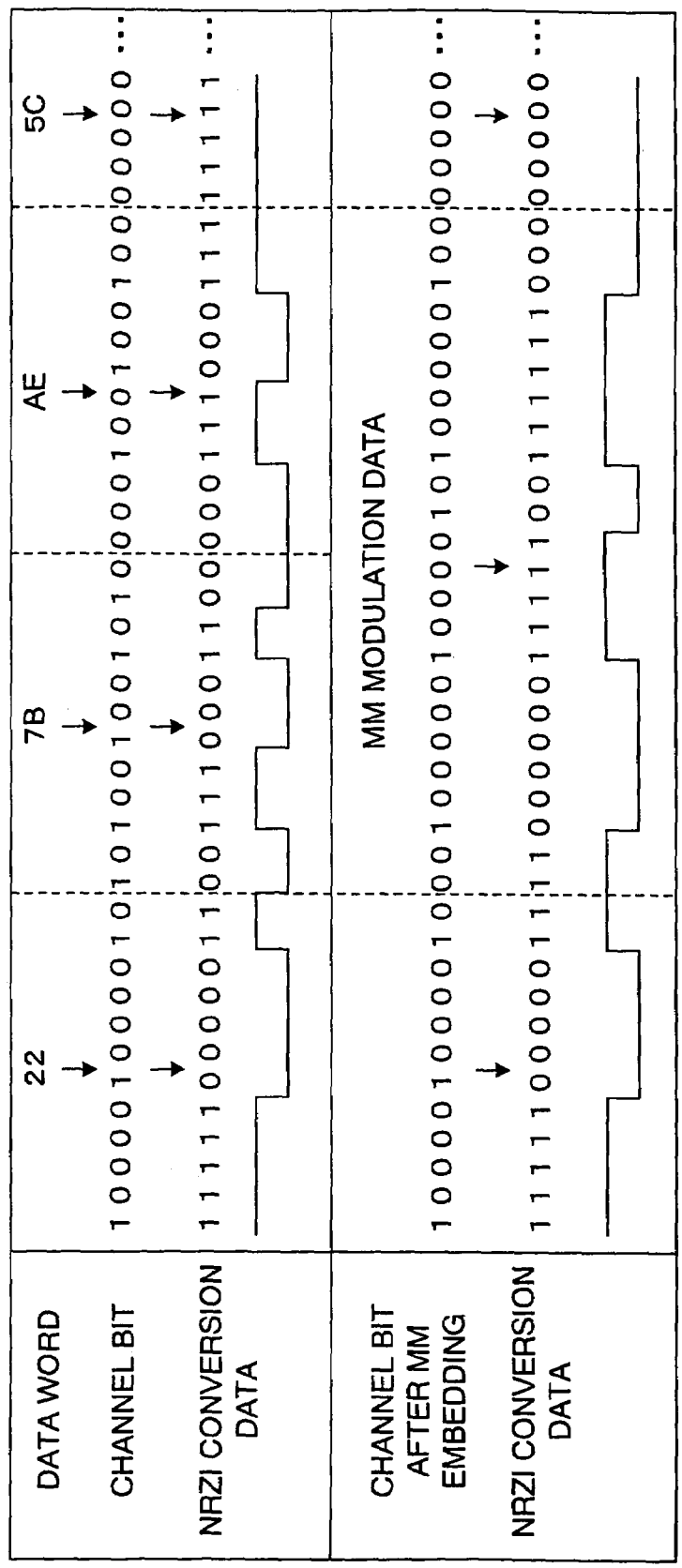
FIG. 8 is a timing chart showing an example of recording signal polarity when the main information is modulated by the modulator shown in FIG. 7.

FIG. 8 is a timing chart showing an example of recording signal polarity when the main information is modulated by the modulator shown in FIG. 7. Data streams "22", "7B", "AE", and "5C" as the codewords (Source Data) are inputted and modulated in sequence. The conversion signal in this event is represented by a code word (channel bit) converted by the modulator and a code NRZI (Non Return to Zero Inversion)-converted immediately before recorded onto the recording medium and its binary waveform. The NRZI conversion code is a recording signal in a mark edge recording method in an optical is a recording signal in a mark edge recording method in an optical disk such as CD, DVD, and so on, and a purpose of the DC component suppress control is to control such that the cumulative difference between the numbers of "1" and "0" in the code after the NRZI conversion becomes zero.

It is assumed here that parts of the data streams "7B" and "AE", are replaced with the media mark modulation signal. The NRZI conversion code of the data stream "5C" differs between the case of the above replacement performed and the case of no replacement performed. This results from the final code of the NRZI conversion code of the data stream "AE" changed from "1" to "0" due to the replacement of the data stream "AE". The change in the final code of the NRZI conversion code of the data stream "AE" is followed by a change in polarity of the recording waveform of the data stream "5C" subsequent thereto.

As described above, the embedding of the media mark modulation signal changes the NRZI conversion code of the main information modulation signal subsequent thereto, disturbing the DC component suppress control.

(Details of Conversion Process)

FIGS. 9A to 9D are schematic views representing data streams shifting when modulation is performed using the modulator shown in FIG. 2.

Data words A to D shown in FIG. 9A are code-converted into code words A to D shown in FIG. 9B, and further converted into code words A' to D' shown in FIG. 9C by performance of the connection rule processing. The code words A' and D' adjacent to a portion replaced with the media mark modulation signal are inversely converted modulator shown in FIG. 2 stops the connection rule processing to thereby realize the similar processing as a result, but the difference therebetween can be neglected.

The code words B' and C' are replaced with the code word MM of the media mark modulation signal to thereby generate the code word streams A, MM, and D, so that the media mark modulation signal is embedded in the main information modulation signal.

Through such processing, only the code words B and C are error data on the main information demodulation side, and the code words A and D will be correctly demodulated if no defect or the like occurs.

In generating the media mark modulation signal MM, the code words A and D are sent to the media mark modulator 14 so that the media mark modulation signal is selected to prevent modulation rule violation from occurring in the main information. The modulation rule violation in the main information mentioned here means state processing violation, RLL violation, and the like.

Comparative Example 1

FIGS. 10A to 10C are schematic views representing data streams shifting when no connection rule processing is performed and representing a comparative example of FIGS. 9A to 9D. Here, the media mark modulation signal is embedded simply.

Data words A to D shown in FIG. 10A are code-converted to generate code words A to D shown in FIG. 10B. In this event, the code conversion states are selected depending on data words immediately before the data words A to D. The code words B and C are replaced with the media mark modulation signal to generate a main information modulation signal with the media mark modulation signal embedded therein shown in FIG. 10C.

In demodulating the main information modulation signal generated, the state which has been used for the modulation of the current code word is judged typically using a next code word. Specifically, the code word A is demodulated using state information corresponding to the code word B, and the code word B is demodulated using state information corresponding to the code word C. In other words, the state processing in demodulating is carried out in a reverse flow to that of the state processing in modulating.

Therefore, simple replacement with the media mark modulation signal will neglect the state rule of the code word. For example, in FIG. 10A to FIG. 10C, it is highly possible that information instructing the state of the code word A disappears and therefore the code word A is incorrectly converted in demodulation.

In contrast to this, in FIG. 9A to FIG. 9D, the modulation processing is carried out depending on the state corresponding to the adjacent codeword in generating the media mark modulation signal, thus reducing the possibility of disappearance of the information instructing the state of the code word.

Comparative Example 2

FIGS. 11A to 11D are schematic views representing data streams shifting when the connection rule processing is performed and representing a comparative example of FIGS. 9A to 9D. The media mark modulation signal is embedded simply.

Data words A to D shown in FIG. 11A are code-converted to generate code words A to D shown in FIG. 11B. In this event, the code conversion states are selected depending on respective data words immediately before the data words A to D. The data words A to D are changed into code words A' to D' based on the connection rule (see FIG. 11C). The area of the code words B' and C' is replaced with the media mark modulation signal, whereby the media mark modulation signal is embedded in the main information modulation signal (see FIG. 11D).

In this case, the code words B' and C' are replaced with the media mark modulation signal (Code MM), whereby the code words A' and D' cannot be returned to the code words A and D in reproducing the main information modulation signal. In short, decoding based on the connection rule becomes impossible, and consequently any of the data words A to D cannot be reproduced.

(Details of Data to be Processed in Disk Recording Device)

Details of data to be processed in the disk recording device in FIG. 1 will be described below.

Figure 12:
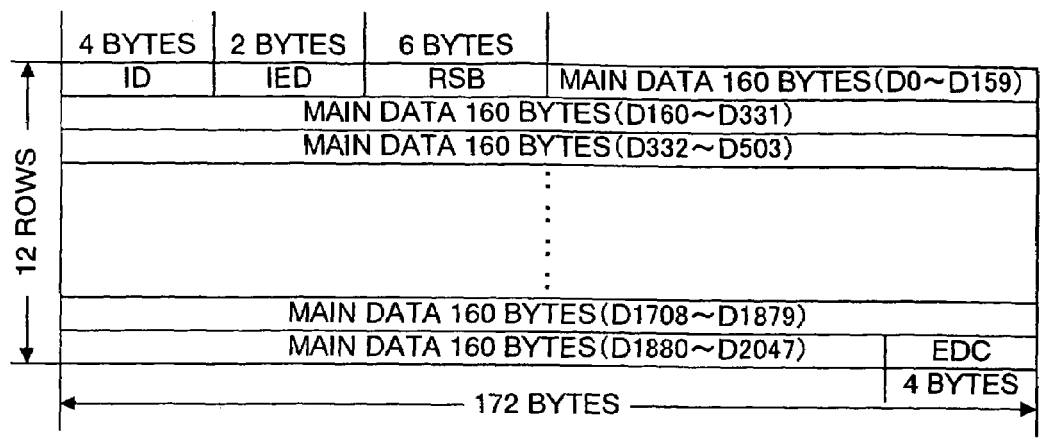
FIG. 12 is a schematic view representing a data frame structure generated in a data frame generator.

FIG. 12 is a schematic view representing a data frame structure generated in the data frame generator R01. The data frame is constituted of a sector identifier (ID), an ID error detection code (IED), auxiliary data (RSB), main data (contents data being main information), and an error detection code (EDC).

Figure 13:
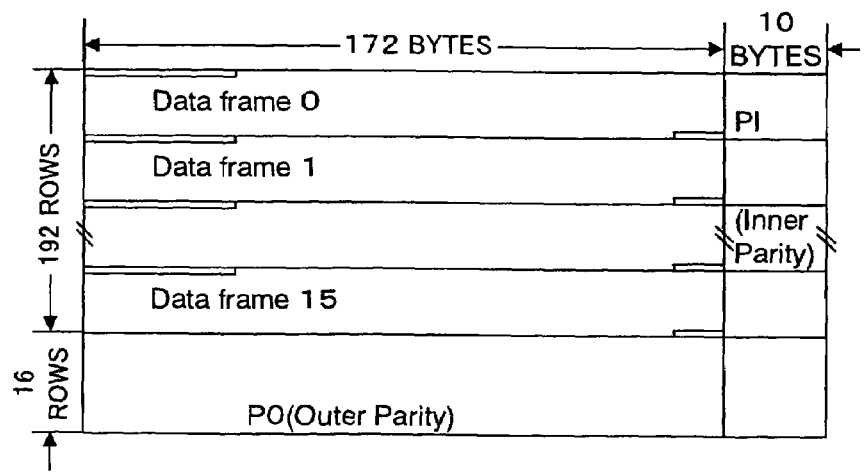
FIG. 13 is a schematic view representing an ECC block outputted from a PO/PI generator.

FIG. 13 is a schematic view representing an ECC block, to which the error correcting outer parity PO and inner parity PI generated are added, outputted from the PO/PI generator R051. The error correcting parities PO and PI are added to a data block which is composed of 16 sets of the data frames shown in FIG. 12 gathered.

Figure 14:
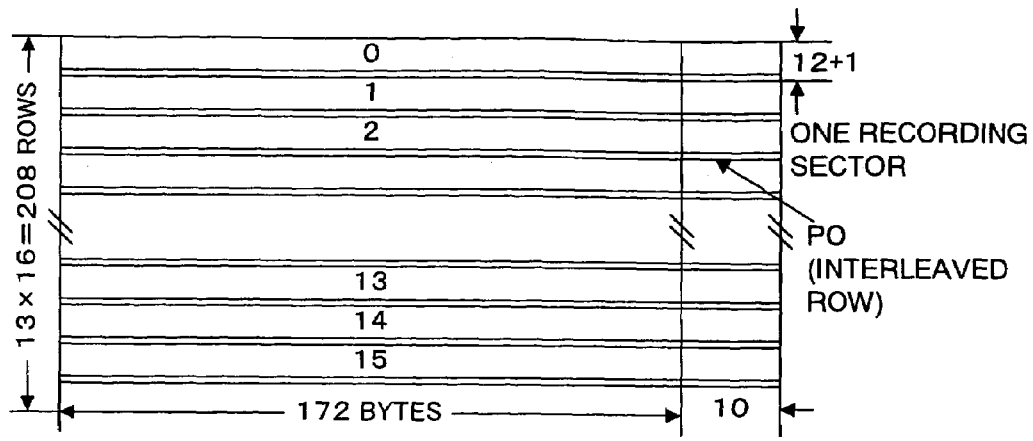
FIG. 14 is a schematic view representing an ECC block in which an error correcting outer parity PO is dispersed, outputted from a PO interleave unit R06.

FIG. 14 is a schematic view representing an ECC block in which the error correcting outer parity PO is dispersed, outputted from the PO interleave unit R06.

Figure 15:
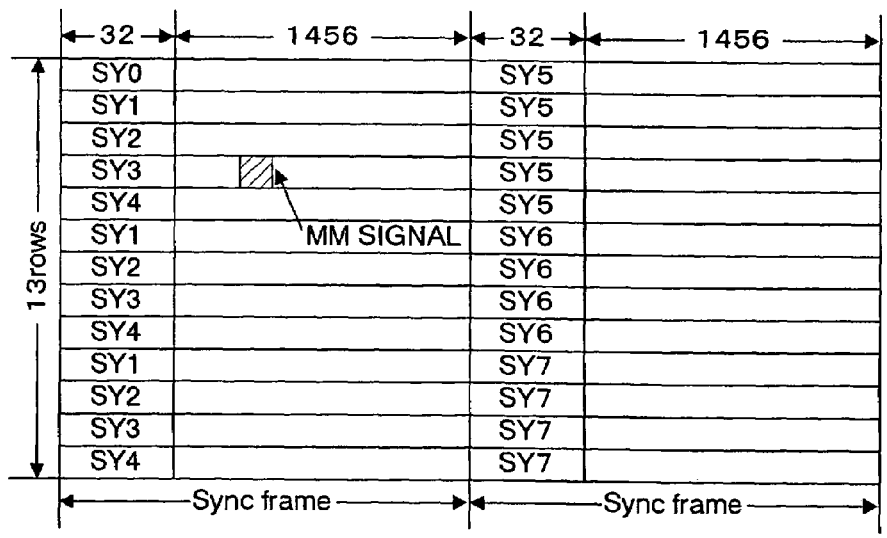
FIG. 15 is a schematic view representing a physical sector in a state in which the media mark signal is incorporated, outputted from a media mark replacing unit.

FIG. 15 a schematic view representing a physical sector in a state in which the media mark signal (MM) is incorporated, outputted from the media mark (MM) replacing unit R14. The media mark modulation signal (MM) is dispersed in a plurality of physical sectors to thereby improve the possibility of reproducing the main information without greatly degrading the ability of correcting an error in the main information. The dispersion of the media mark modulation signal leads to improvement in confidentiality thereof.

Modification Example 1

As has been described, it is typical that the pattern selected as the media mark modulation signal is limited to the pattern which causes no modulation rule violation in the main information. As a result of this, the embedding area of the media mark modulation signal is increased to accommodate the number of the patterns of the media mark modulation signal, thus causing a possibility of increasing the area which will be incorrectly reproduced in demodulating the main information.

FIGS. 16A to 16E are schematic views representing data streams changed in a conversion process different from that in FIG. 9A to 9D.

Figure 16D:
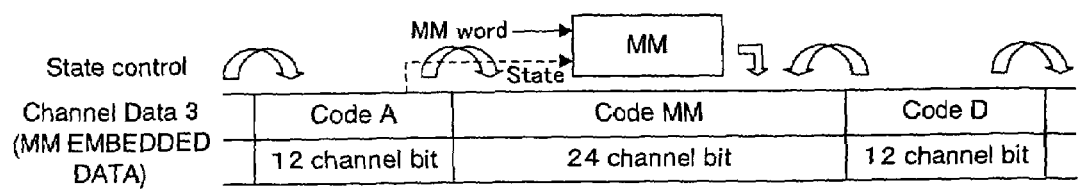

Data words A to D shown in FIG. 16A are code-converted into code words A to D shown in FIG. 16B, and further converted into code words A' to D' shown in FIG. 16C by performance of the connection rule processing. Then, the code words A' and D' adjacent to a portion replaced with the media mark modulation signal are inversely converted into code words A and D (FIG. 16D). The processing so far is the same as that in FIG. 9A to 9D.

Figure 16E:
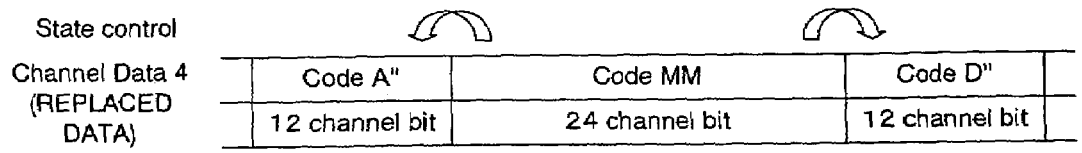
Figures 18A, 18B, 18C, 18D:
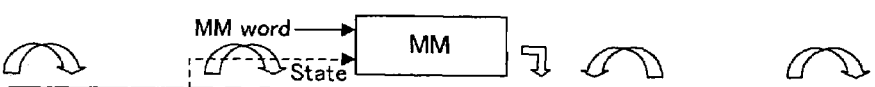
FIGS. 18A to 18D are schematic views representing data streams changed in modulation processing according to Modification Example 3 of the present invention.

The code words B' and C' are replaced with the code word MM of the media mark modulation signal to generate code word streams A", MM, D" shown in FIG. 16E, whereby the media mark modulation signal is embedded in the main information modulation signal. In short, in addition to replacement of the code words B' and C' with the code word MM of the media mark modulation signal, the code word streams A and D are converted into the codeword streams A"and D", respectively.

The code word streams A" and D" after conversion are decided depending on the combination of the code word MM of the media mark modulation signal and the core word streams A and D. This is for preventing occurrence of modulation rule violation in the main information. The code word streams A" and D" are to be returned to the data words A and D in demodulating the main information in a similar manner to that for the code word streams A and D. For example, assuming that a data word D modulated in a state of 0 is regarded as a code word D, the data word D modulated in a state of 1 or 2 can be regarded as the code word D". It should be noted that the procedure of generating the media mark modulation signal MM is the same as that in the case of FIG. 9A to 9D.

Owing to such processing, only the code words B and C may have error data on the main information demodulation side as in FIG. 9A to 9D, and the code words A" and D" will be correctly demodulated if no defect or the like occurs.

Modification Example 2

FIGS. 17A to 17C are schematic views representing data streams shifting when no connection rule processing is performed for the data word connected to the place which will be replaced with the media mark modulation signal. The procedure of generating the media mark modulation signal is the same as that in FIG. 9A to 9D.

Modification Example 3

In FIGS. 18A to 18D, after the performance of replacement with the media mark modulation signal (MM) by the processing shown in FIGS. 17A to 17C, the code word streams A and D are converted into code word streams A" and D", respectively. The code word streams A" and D" after conversion are decided, in the similar manner to that in FIG. 16E, depending on the combination of the code word MM of the media mark modulation signal and the code word streams A and D.

(Demodulator)

Figure 19:
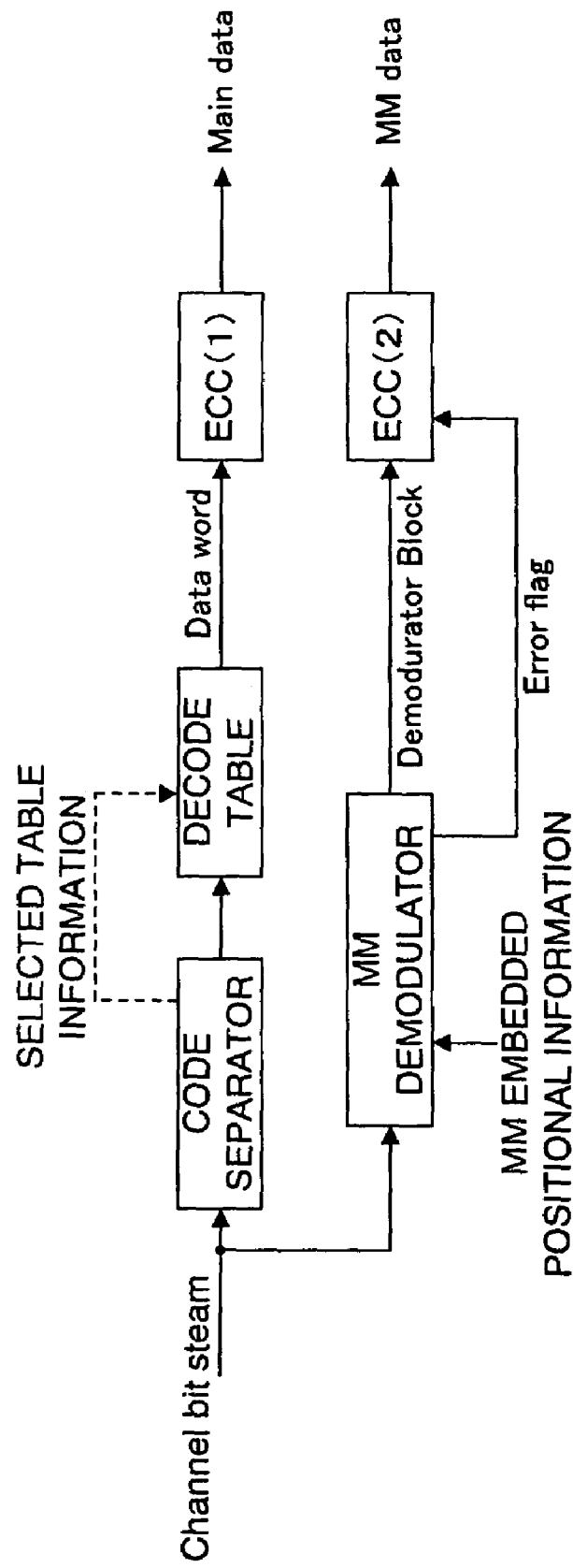
FIG. 19 is a block diagram representing a configuration example of a demodulator which demodulates a main information modulation signal with a media mark modulation signal embedded therein.

FIG. 19 is a block diagram representing a configuration example of a demodulator which demodulates a main information modulation signal with a media mark modulation signal embedded therein.

A channel bit stream of the main information modulation signal with the media mark modulation signal embedded therein is inputted into a code separator where the code conversion based on the connection rule is canceled to generate a code word (a kind of inverse conversion). The code word is inputted into a decode table unit where the code conversion based on the code conversion table as shown in FIG. 3A is canceled to generate a data word. In the above manner, the main information modulation signal with the media mark modulation signal embedded therein is subjected to demodulation processing. It should be noted that the processing in the decode table unit, selected table information (information on the selection of a table, specifically, state information) is used which is outputted from the code separator.

The data word is inputted into a first error correction unit (ECC (1)) and subjected to error correction processing, whereby the data word of the main information before embedding of (replacement with) the media mark modulation signal is reproduced. This is because the media mark embedded in the main information is similar to error data due to a general defect in the viewpoint of the error correction processing.

The channel bit stream of the main information modulation signal with the media mark modulation signal (MM) embedded therein is also inputted into a media mark demodulator where the media mark modulation signal is demodulated. Into the media mark demodulator, media mark embedded positional information (MM Position) is inputted so that only an area of the channel bit indicated by this information becomes demodulation subject.

Since the media mark modulation signal is dispersed and embedded in the main information modulation signal, demodulation of the media mark modulation signal in the media mark demodulator and output thereof are carried out intermittently. A media mark demodulation signal thus intermittently outputted is inputted into a media mark correcting unit (ECC(2)) and gathered here. The media mark demodulation signal thus gathered is subjected to error correction processing to become a media mark signal with its error corrected.

In this error correction processing, an error flag can be used which is generated in demodulating the media mark modulation signal. More specifically, when a pattern that is not normally used appears in demodulating the media mark modulation signal, it can be judged that an error occurs in the media mark modulation signal, and an error flag can be provided.

In this event, the use of a method, which is different from the modulation method for the main information, for the modulation method for the media mark enables improvement in reliability of the error flag. This is because of the following reason. A modulation pattern different from that for the main information is used for the media mark modulation signal, so that even when the media mark modulation signal is demodulated by the demodulator for the main information and modulated again by the main information modulator, the resultant media mark signal is prevented from being returned to the original media mark signal (inverse conversion is impossible). As a result, it becomes easy to use as for the media mark modulation method, a modulation method with a high conversion redundancy using a larger number of bits than the number of bits normally required. In this case, there will exist many patterns that are not used under normal situation in the media mark modulation method. This results in increased possibility of detecting an error such that when a pattern appears that is not normally used in demodulating the media mark modulation signal, it is regarded as an error occurring in the media mark modulation signal (it becomes possible to provide a highly reliable correcting error flag).

(Application)

An application of the modulator according to the embodiment will be described.

1. Recording Processing in Read-only Optical Disk

Figure 20:
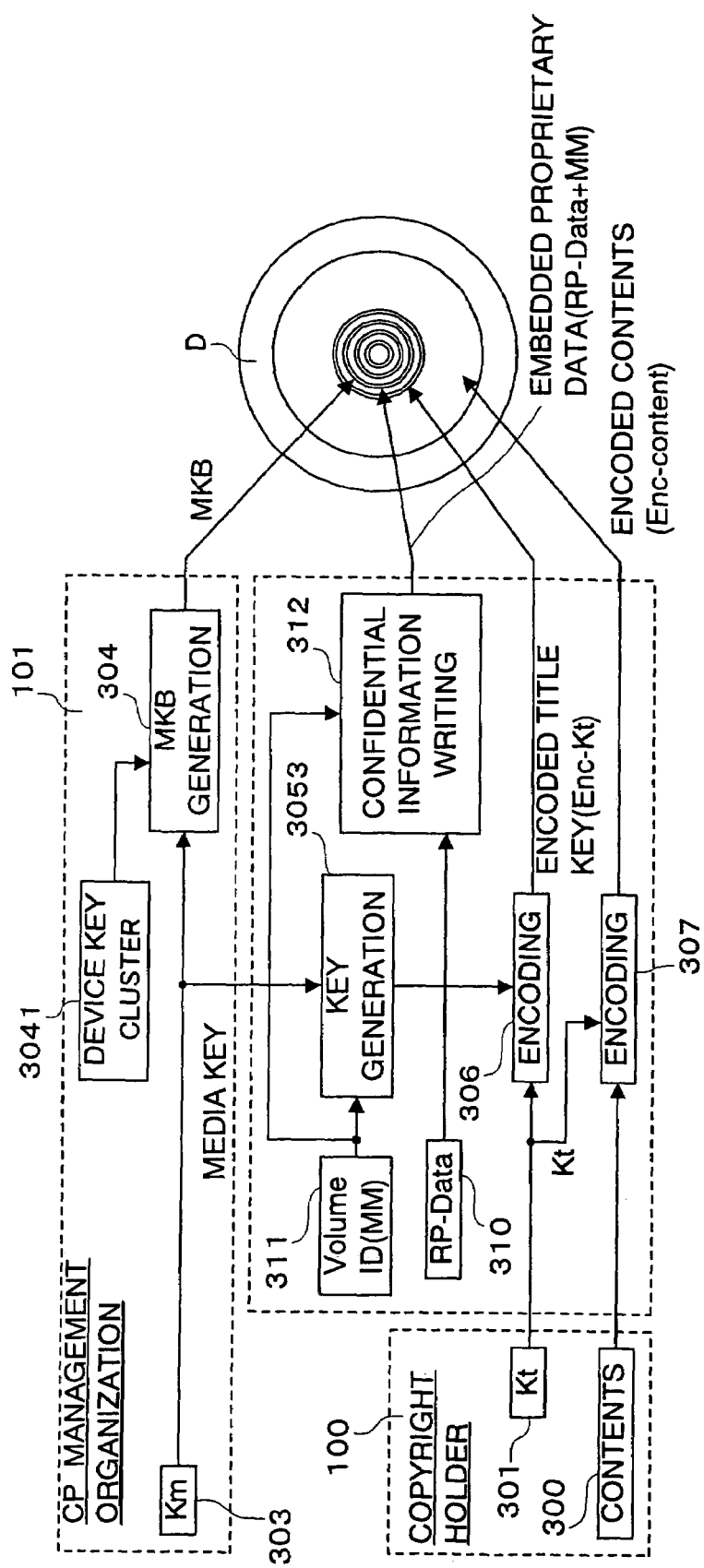
FIG. 20 is a diagram illustrating an example of a procedure of encoding contents in a read-only optical disk.

FIG. 20 is a diagram illustrating an example of a procedure of encoding contents in a read-only optical disk.

A disk manufacturer receives contents 300 and a title key (Kt) 301 from a copyright holder 100. The disk manufacturer also receives a media key (Km) 303 for use in encoding the contents and a media key block (MKB) generated by a device key set from a copyright protection (CP) management organization 101.

An encoding processing unit 307 encodes the contents using the title key (Kt) as an encryption key to generate encoded contents (Enc-Contents). An encoding processing unit 306 encodes the title key (Kt) using a media specific key (Kmu) to generate an encoded title key (Enc-Kt). The media specific key (Kmu) used in this event is generated by mixing a volume identifier (Volume ID) 311 and the media key (Km) 303 in a key generator 3053.

A confidential information writing unit 312 embeds the volume identifier (Volume ID) as confidential information in proprietary data (RP-data) whose ownership is possessed by the disk manufacturer to generate embedded proprietary data (RP-data+MM). To this processing in the confidential information writing unit 312, the modulator illustrated in the above-described embodiment can be applied. In this case, the proprietary data (RP-data) as the main information and the volume identifier (Volume ID) as the confidential information are modulated respectively, so that the confidential information is embedded in the main information.

A master disk is manufactured on which the media key block (MKB), the embedded proprietary data (RP-data+MM), the encoded title key (Enc-Kt), and the encoded contents (Enc-Contents) generated are recorded. This master disk is used to manufacture read-only media on which encoded contents are recorded.

2. Reproducing Processing in Read-only Optical Disk

Figure 21:
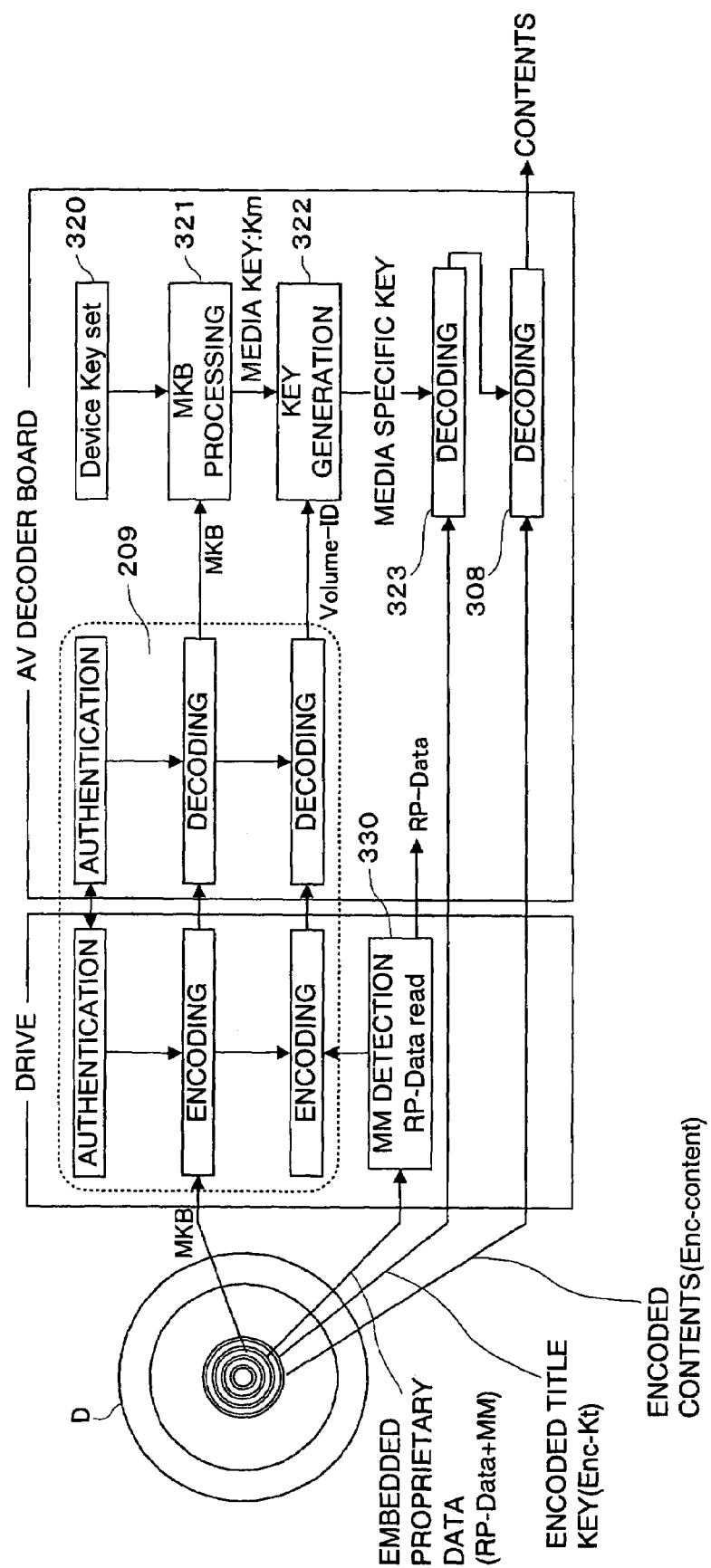
FIG. 21 is a diagram illustrating an example of a procedure of decoding the contents in the read-only optical disk.

FIG. 21 is a diagram illustrating a procedure of reproducing the read-only media manufactured by the procedure shown in FIG. 20. Such a case is illustrated that the recording medium is reproduced by a data reading drive connected to an AV (Audio/video) decoder board mounted on a computer.

The data reading drive reads from the recording medium D the media keyblock (MKB), the embedded proprietary data (RP-data+MM), the encoded title key (Enc-Kt), and the encoded contents (Enc-Contents).

After authentication is carried out between the data reading drive and the AV decoder board, the media key block (MKB) and the embedded proprietary data (RP-data+MM) are outputted from the data reading drive to the AV decoder board. The signal outputted in this event is encoded on the drive side by a time-limited key and decoded on the AV decoder board side to thereby prevent unauthorized extraction on a transmission line.

The encoded title key (Enc-Kt) and the encoded contents (Enc-Contents) are transmitted from the data reading drive to the AV decoder board as they are without encoding.

The embedded proprietary data (RP-data+MM) is inputted into a confidential information detector 330 and separated into the proprietary data (RP-data) and the volume identifier (Volume ID) being confidential information. To this processing in the confidential information detector 330, the decoding processing, utilizing the demodulator, illustrated in the above-described embodiment can be applied. In this case, the proprietary data (RP-data) as the main information and the volume identifier (Volume ID) as the confidential information are demodulated respectively, so that the main information and the confidential information are separated.

On the AV decoder board side, the media key (Km) is extracted by inputting the media key block (MKB) received and the device key set 320 into an MKB processing unit 321. The media key (Km) and the volume identifier (Volume ID) are mixed in a key generator 322 to generate the media specific key (Kmu).

The encoded title key (Enc-Kt) is decoded using the media specific key (Kmu) in a decoding unit 323 to detect the title key (Kt). The encoded contents (Enc-Contents) are decoded by a decoding unit 308 using the title key (Kt) to reproduce contents in a plain text.

As described above, the volume identifier (Volume ID), embedded as confidential information in the proprietary data (RP-data), is recorded on the recording medium. Therefore, even if all the data on the recording medium is copied, it is difficult to decode the encoded contents on a medium which has been illegally copied unless the volume identifier (Volume ID) can be separated. Since the volume identifier (Volume ID) is detected only in the drive and transmitted to the authenticated AV decoder board, extraction of the volume identifier (Volume ID) during transmission is difficult, so that the copyright protection can be realized.

3. Recording Processing in Read/Write Optical Disk

A case in which the modulator is applied to recording processing in a read/write optical disk will be described. In the read/write optical disk, the processing can be divided to that of manufacturing the optical disk and that of recording by a user.

(1) In Manufacturing Recording Medium

Figure 22:
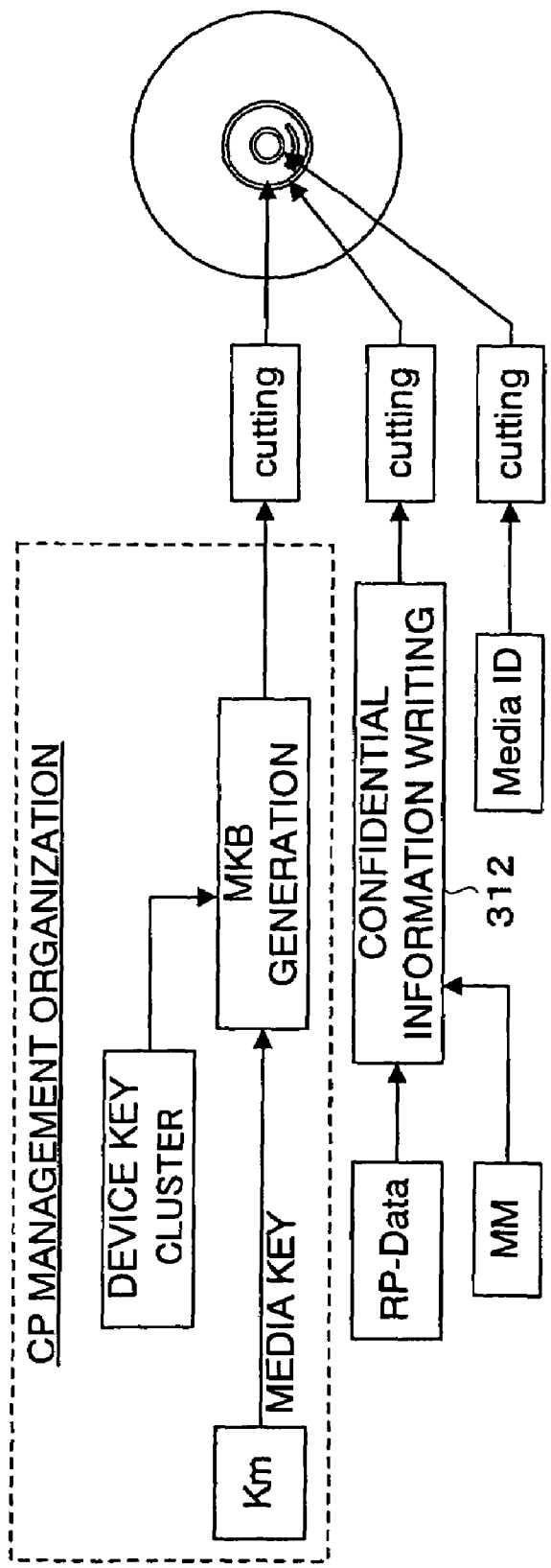
FIG. 22 is a diagram illustrating an example of a procedure of processing in manufacturing a read/write optical disk.

FIG. 22 illustrates processing contents in manufacturing a read/write optical disk.

The disk manufacturer receives a media key (Km) for use in encoding contents and a media key block (MKB) generated by a device key set from a copyright protection (CP) management organization.

A confidential information writing unit 312 embeds a media mark (MM) as confidential information in proprietary data (RP-data) to generate embedded proprietary data (RP-data+MM). To this processing in the confidential information writing unit, the modulation and replacement processing illustrated in the above-described embodiment can be applied. In this case, the proprietary data (RP-data) as the main information and the media mark (MM) as the confidential information are modulated respectively, so that the confidential information is embedded in the main information.

The disk manufacturer also prepares a media identifier (M-ID: Media ID) which uniquely identifies the recording medium.

A read/write optical disk is manufactured on which the media key block (MKB), the embedded proprietary data (RP-data+MM), and the media identifier (Media ID) are recorded.

(2) In Recording by User

Figure 23:
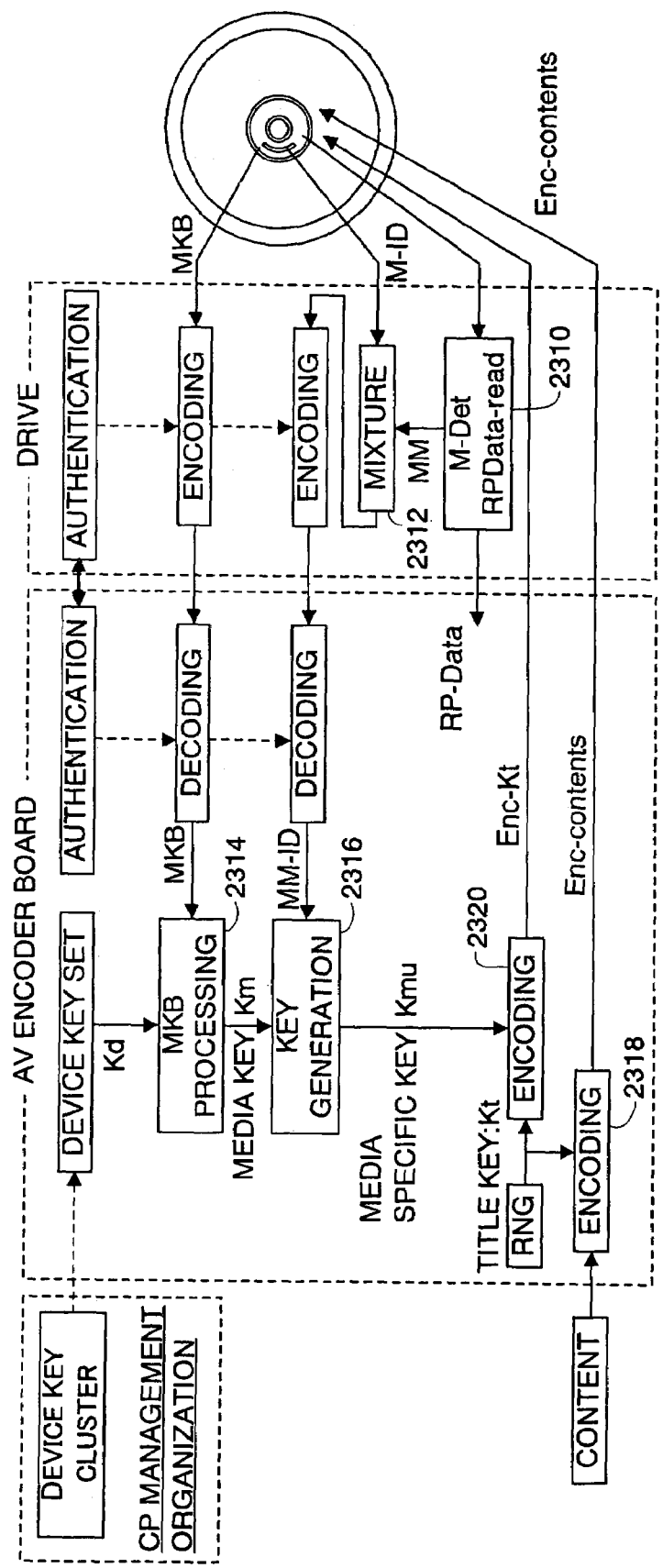
FIG. 23 is a diagram illustrating an example of a procedure of encoding contents in the read/write optical disk.

FIG. 23 is a diagram illustrating a procedure of encoding contents and recording the resultant contents on a read/write medium having a configuration such as shown in FIG. 22. Such a case is illustrated that recording onto the recording medium is performed by a data writing drive connected to an AV (Audio/Video) encoder board mounted on a computer.

The drive reads from the recording medium the media key block (MKB), the media identifier (M-ID), and the embedded proprietary data (RP-data+MM).

The embedded proprietary data (RP-data+MM) is inputted into a confidential information detector 2310 and separated into the proprietary data (RP-data) and the media mark (MM) being confidential information. To this processing in the confidential information detector 2310, the demodulator illustrated in the above-described embodiment can be applied. In this case, the proprietary data (RP-data) as the main information and the media mark (MM) as the confidential information are demodulated respectively, so that the main information and the confidential information are separated.

The media identifier (M-ID) and the media mark (MM) are mixed in mixed 2312 to generate a media mark identifier (MM-ID).

After authentication processing is carried out between the drive and the AV encoder board, the media key block (MKB) and the media mark identifier (MM-ID) are outputted from the drive to the AV encoder board. The signal outputted in this event is encoded on the drive side by a time-limited key and decoded on the AV encoder board side to thereby prevent unauthorized extraction on a transmission line.

On the AV encoder board side, the media key (Km) is extracted by inputting the media key block (MKB) received and a device key set into an MKB processing unit 2314. The media key (Km) and the media mark identifier (MM-ID) are mixed in a key generator 2316 to generate a media specific key (Kmu).

The contents are encoded in encoder 2318 using the title key (Kt) to generate encoded contents (Enc-Contents), which are record onto the recording medium.

Figure 24:
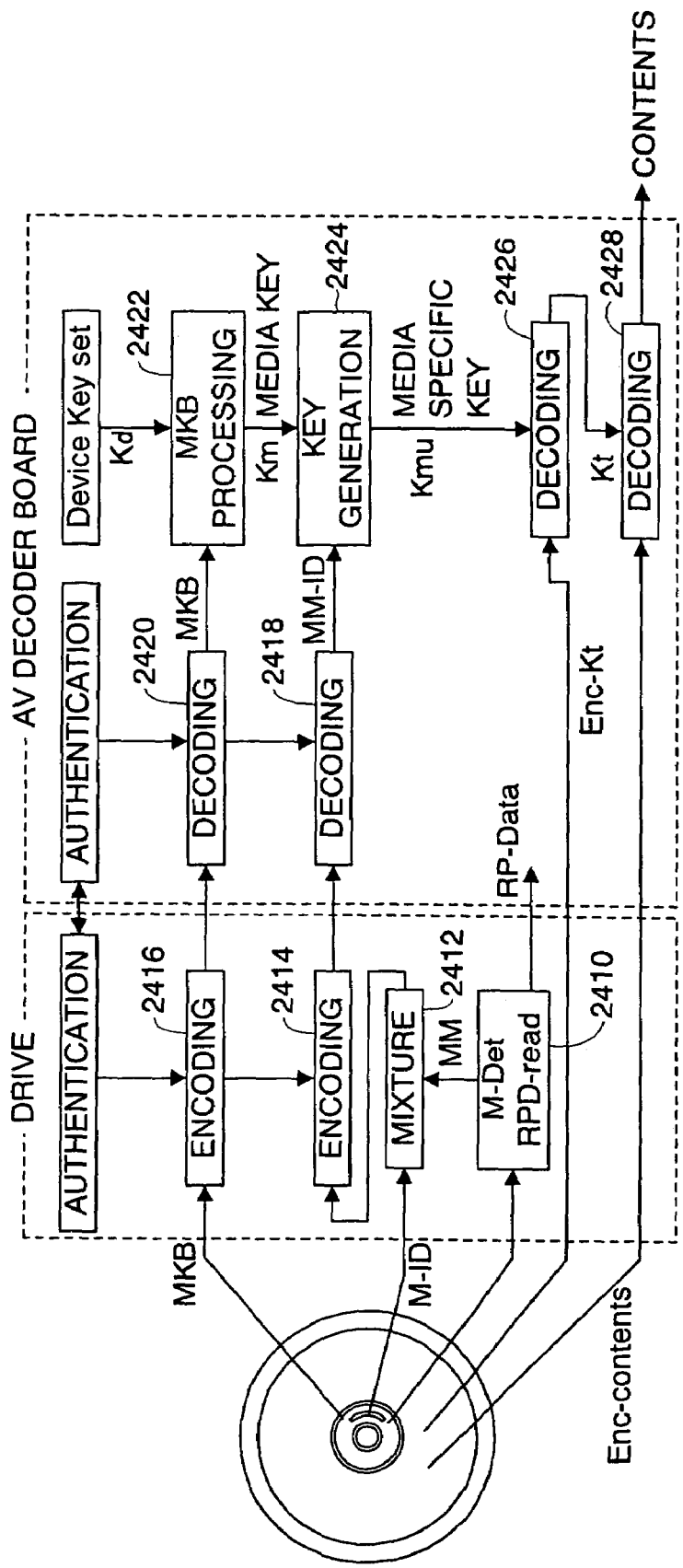
FIG. 24 is a diagram illustrating an example of a procedure of decoding the contents in the read/write optical disk.

The title key (Kt) is encoded in encoder 2320 using the media specific key (Kmu) to generate an encoded title key (Enc-Kt), which is recorded onto the recording medium. ps 4. Reproducing Processing in Read/Write Optical Disk FIG. 24 illustrates a procedure of reading and decoding the encoded contents recorded in the configuration in FIG. 23 to reproduce contents in a plain text. Such a case is illustrated that recording onto the recording medium is performed by a data writing drive connected to an AV (Audio/Video) decoder board mounted on a computer.

The drive reads from the recording medium the media key block (MKB), the media identifier (M-ID), the embedded proprietary data (RP-data+MM), the encoded title key (Enc-Kt), and the encoded contents (Enc-Contents).

The embedded proprietary data (RP-data+MM) is inputted into a confidential information detector 2410 and separated into the proprietary data (RP-data) and the media mark (MM) being the confidential information. To this processing in the confidential information detector, the demodulator illustrated in the above-described embodiment can be applied.

The media identifier (M-ID) and the media mark (MM) are mixed in mixer 2412 to generate the media mark identifier (MM-ID).

After authentication processing is carried out between the drive and the AV decoder board, the media key block (MKB) and the media mark identifier (MM-ID) are outputted from the drive to the AV decoder board. The signal outputted in this event is encoded by encoders 2414 and 2416 on the drive side by a time-limited key and decoded by decoders 2418 and 2420 on the AV decoder board side to thereby prevent unauthorized extraction on a transmission line.

The encoded title key (Enc-Kt) and the encoded contents (Enc-Contents) are transmitted from the data reading drive to the AV decoder board as they are without encoding.

On the AV decoder board side, the media key (Km) is extracted by inputting the media key block (MKB) received and a device key set into an MKB processing unit 2422. The media key (Km) and the media mark identifier (MM-ID) are mixed in a key generator 2424 to generate the media specific key (Kmu).

The encoded title key (Enc-Kt) is decoded using the media specific key (Kmu) in a decoding unit 2426 to detect the title key (Kt). The encoded contents (Enc-Contents) are decoded using the title key (Kt) in a decoding unit 2428 to reproduce contents in a plain text.

As described above, the media mark (MM), embedded as confidential information in the proprietary data (RP-data), is recorded on the recording medium. Therefore, even if all the data on the recording medium is copied, it is difficult to decode the encoded contents on a medium which has been illegally copied unless the media mark (MM) can be separated. Since the media mark (MM) can be detected and processed only in the drive, it is possible to ensure the confidentiality of the media mark (MM) and realize the copyright protection.

Second Embodiment

Figure 25:
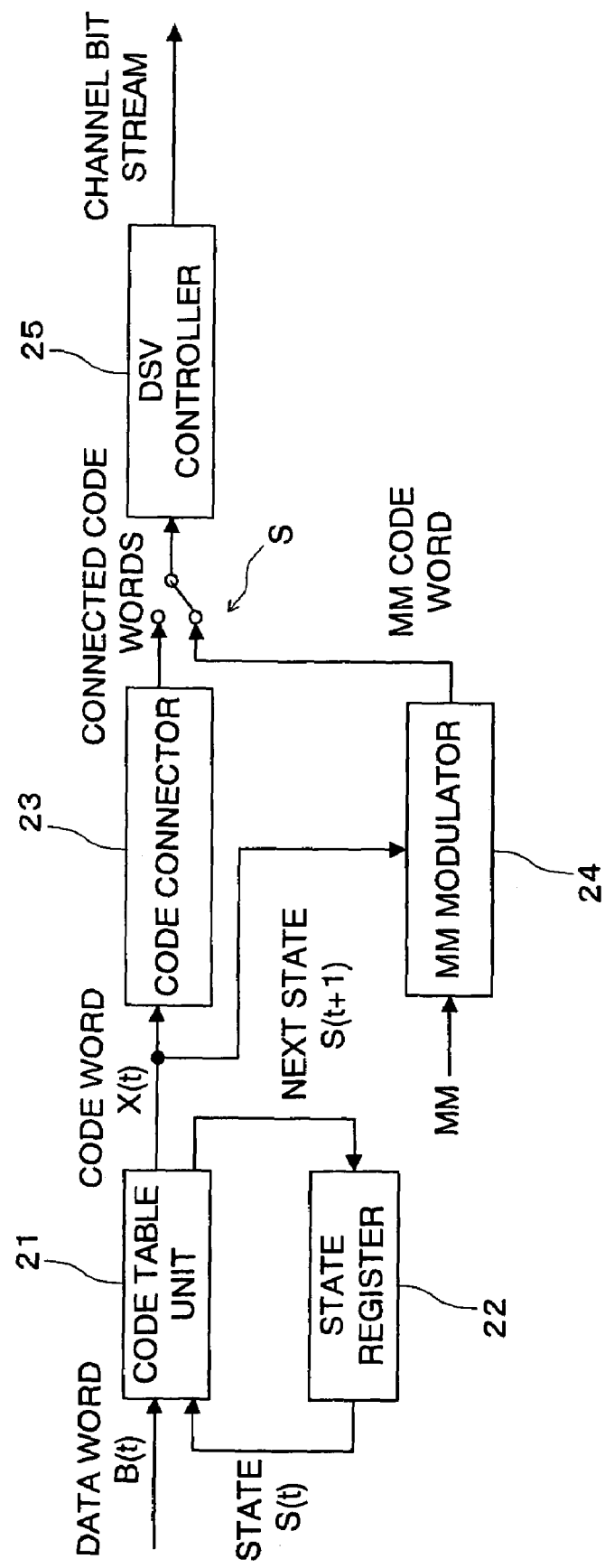
FIG. 25 is a block diagram representing details of an internal configuration of a modulator according to a second embodiment.

FIG. 25 is a block diagram, corresponding to FIG. 2, representing details of an internal configuration of the modulator R071 shown in FIG. 1, and illustrating a second embodiment of the present invention.

A code word outputted from a code table unit 21 is inputted into a media mark modulator 24 and used in modulating a media mark (MM).

This information is used for control of a state in modulating the media mark. Further, it becomes possible to process together the media mark to be embedded and code words before and after the mark. More specifically, by applying the connection rule between the media mark and the codewords before and after the mark, propagation of an error caused by embedding a media mark signal (MM) can be reduced.

This drawing is basically not different from FIG. 2 in the other points, and therefore detailed description is omitted.

Third Embodiment

Figure 26:
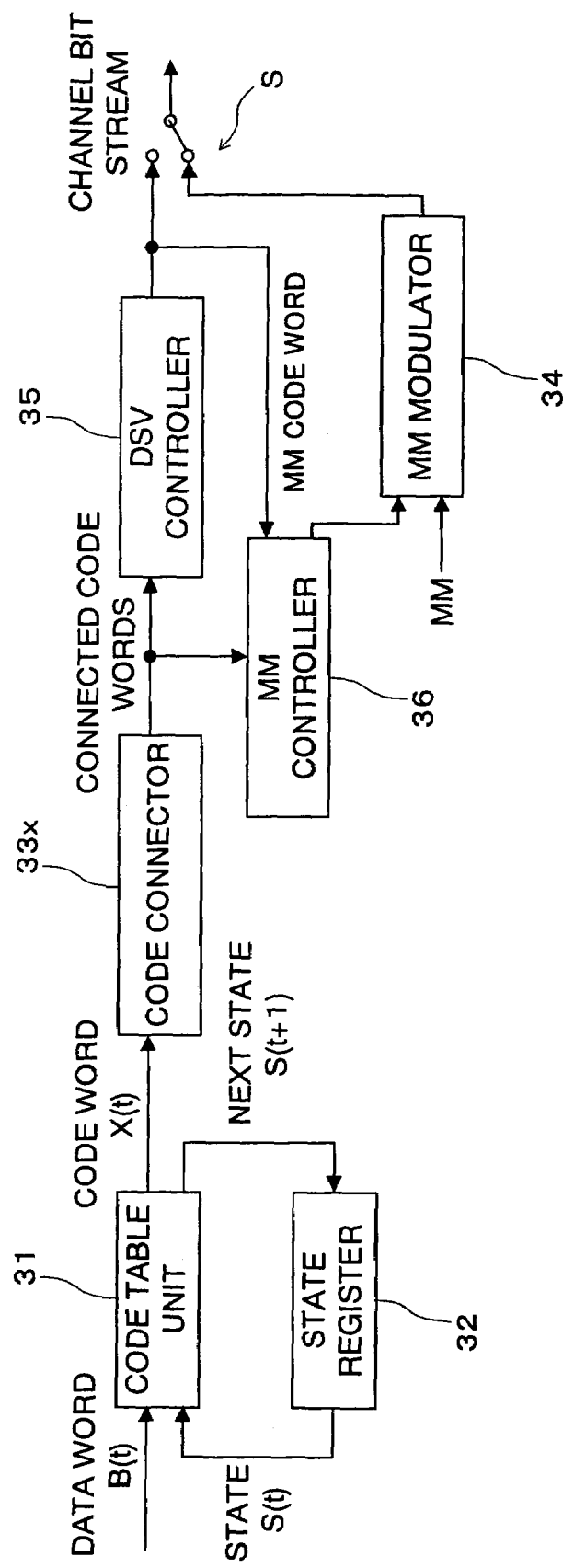
FIG. 26 is a block diagram representing details of an internal configuration of a modulator according to a third embodiment.

FIG. 26 is a block diagram, corresponding to FIG. 2, representing details of an internal configuration of the modulator R071 shown in FIG. 1, and illustrating a third embodiment.

Processing in a code table unit 31 and processing in a code connector 33x are performed in sequence.

A connected code word signal which has undergone the connection rule processing in the code connector 33x is inputted into a media mark controller 36. The media mark controller 36 cancels the connection rule processing in the connected code word. The code word whose connection rule processing has been cancelled is inputted into a media mark modulator 34 and processed together with the media mark signal. The media mark signal and the code words before and after the signal are processed in the media mark modulator 34 under consideration of the connection rule.

By switching using a switch S between the connected code word outputted from a DSV controller 35 and the media mark modulation signal (including the code words before and after the signal) outputted from the media mark modulator 34, confidential information is embedded in main information.

The connected code word signal outputted from the DSV controller 35 is inputted into the media mark controller 36. This is for allowing the media mark controller 36 to detect the number of "1s" of original channel bits in an area into which the media mark is inserted and to control the number of "1s" of channel bits of the media mark signal to be inserted equal to the above number. This results in prevention of deterioration in the DC-component suppress characteristics which may be caused by embedding the media mark in a signal after the processing in the DSV controller 35.

Fourth Embodiment

Figure 27:
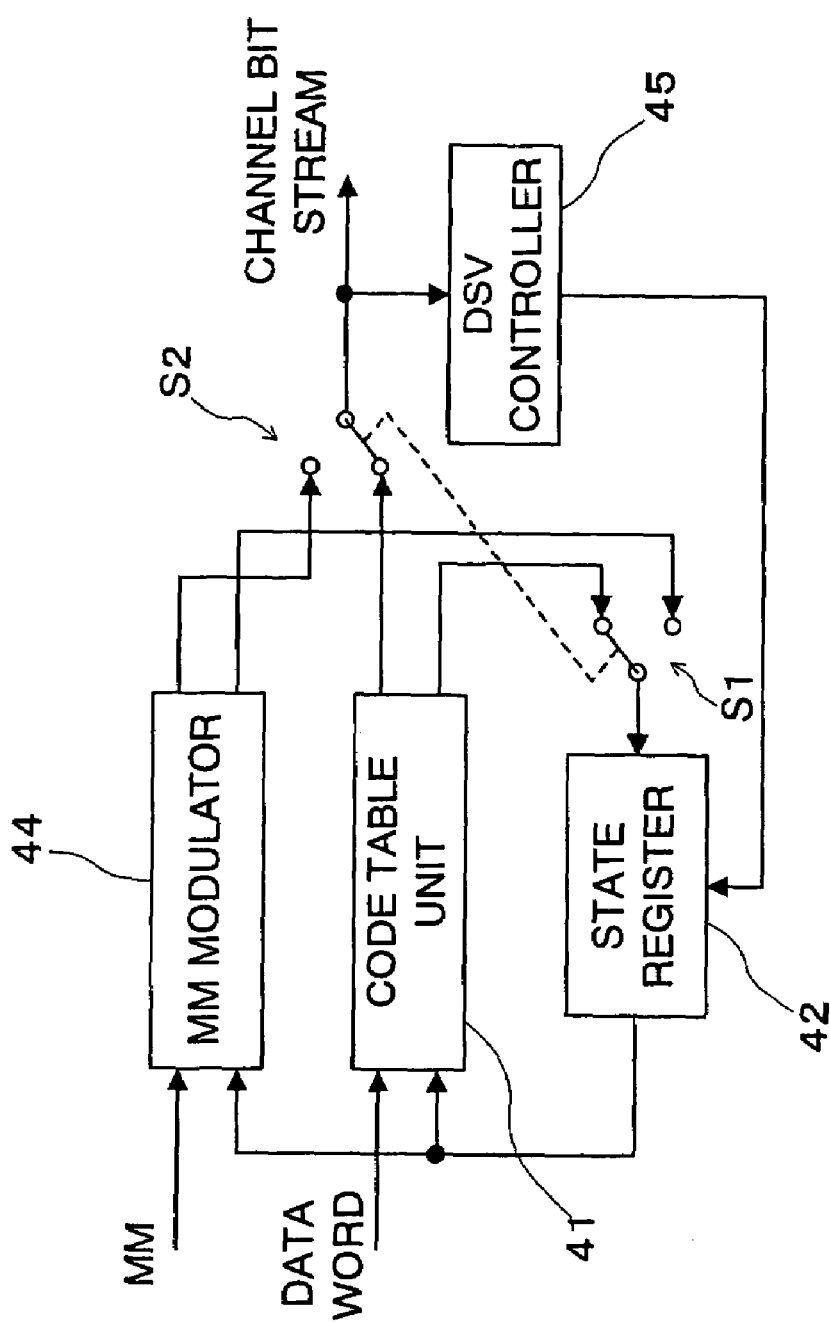
FIG. 27 is a block diagram representing details of an internal configuration of a modulator according to a fourth embodiment.

FIG. 27 is a block diagram, corresponding to FIG. 2, representing details of an internal configuration of the modulator R071 shown in FIG. 1, and illustrating a fourth embodiment.

A code table unit 41 for main information and a media mark modulator 44 operate in parallel to generate a code word and a media mark modulation signal respectively. A state register 42 in this event is common to the code table unit 41 for the main information and the media mark modulator 44 and is switched between the two by the switch S1. This switching is performed in conjunction with switching of output between the code word and the media mark modulation signal by a switch S2, and the code table unit 41 and the media mark modulator 44 are alternately operated in accordance with whether replacement with the media mark signal is performed (to cause the media mark modulator 44 to operate at a position of a symbol to be replaced with the media mark signal).

The channel bit stream outputted from the switch S2 is inputted into a DSV controller 45 and used for control of the state register 42 by the DSV controller 45. The DSV controller 45 monitors the cumulative DC components of the channel bit stream and changes the state indicated by the state register 42 in accordance with the monitoring result. The code table unit 41 and the media mark modulator 44 operate in accordance with the change of this state, whereby DSV is controlled.

Fifth Embodiment

Figure 28:
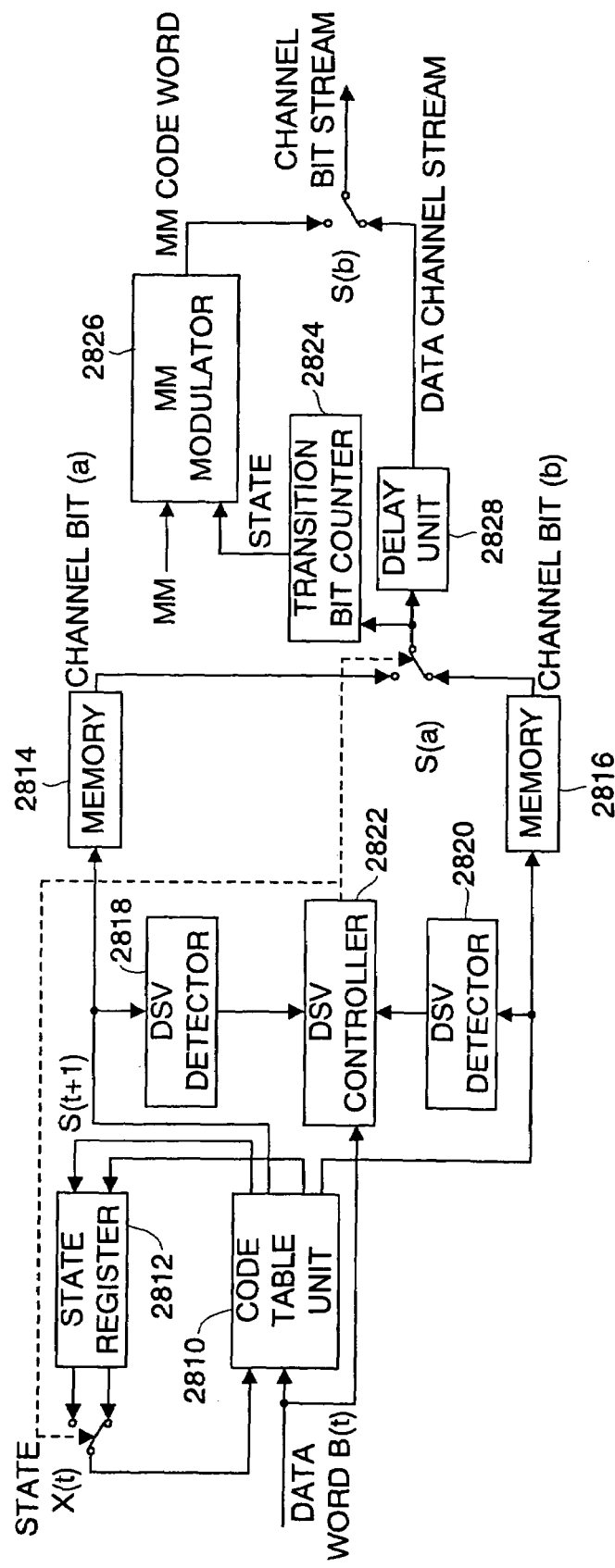
FIG. 28 is a block diagram representing details of an internal configuration of a modulator according to a fifth embodiment.

FIG. 28 relates to a fifth embodiment of the present invention and illustrates a case in which an MM modulator is incorporated in the 8–16 modulation method shown in DVD standard.

The modulation method shown in the DVD standard will be described. In the modulation method in the DVD standard, four states are prepared for each symbol, and a code table unit is configured such as to prevent modulation rule violation from occurring in connection between the symbols. Four additional states are provided for a part of data word and used for the DSV control. The states of the synchronization signals also can be selected to perform DSV control, and both of them are used to perform the DSV control. When a DSV controllable data word and synchronization signal are given, a plurality of conversion patterns are stored in a memory respectively to configure a plurality of channel bit streams and DSV detection is performed for them independently. When a DSV controllable particular data word and synchronization signal are given, a stream having less DSV of the streams stored in the aforementioned memory is selected and the other stream is discarded. By performing such operation, control is repeated to finally select a conversion pattern to provide a stream with less DSV.

FIG. 28 is an embodiment corresponding to the modulation method of such a DVD standard.

A code table unit 2810 modulates data words B(t) in accordance with the state indicated by state register 2812 to generate channel bits. The modulations are conducted in parallel based on two tables (main table and substitution table). In modulation results respectively based on the two tables, a result having a smaller DSV is selected and outputted to control DSV.

The main table defines modulation codes of 16 bits in accordance with data words from 0 to 256 of decimal representation and four states, respectively. The substitution table defines modulation codes of 16 bits in accordance with data words from 0 to 87 of decimal representation and four states, respectively.

The code table unit 2810 modulates data words B(t) in accordance with the state represented by the state resistor 2812 using the two tables. If data words are in the range from 0 to 87, the code table unit 2810 outputs the channel bits modulated by the main table to the memory a (2814), and the channel bits modulated by the substitution table to the memory b (2816). On the other hand, if data words are in the range from 88 to 255, the code table unit 2810 outputs the channel bits modulated by the main table to both of the memory a (2814) and b (2816). In other words, if data words are in the range from 88 to 256, modulation by the substitution table and selection of modulation results are not conducted. The memory a (2814) and b (2816) store inputted values.

The respective DSVs of the channel bits (a) and (b) thus outputted are detected by DSV detectors 2818 and 2820 respectively, and the detection results are inputted into the DSV controller 2822. Based on the detection results, the DSV controller 2822 controls the output of the state register 2812 by the switch (as shown by the dotted line) to thereby perform the DSV control. The DVS controller 2822 also controls switch S(a) to selectively feed the output of memories 2814 and 2816 to a transition bit counter 2824 and delay unit 2828.

The transition bit counter 2824 counts the number of "1s" of the channel bit in a media mark signal (MM) embedded area and judges whether the total thereof is even or odd, and outputs a state signal to the media mark modulator 2826 in accordance with the result.

The media mark modulator 2826, into which the state signal for modulating the media mark is inputted together with the media mark (MM), matches the even/odd parity of the total of "1s" in the media mark modulation pattern with the even/odd parity of the total of "1s" in the channel bit before replacement. Such processing is performed to prevent the deterioration in the DSV characteristics due to the embedding of the media mark. In other words, when the NRZI conversion is performed for generation of the recording signal, the polarity at the final stage of the media mark modulation pattern described with FIG. 8 can be matched with the polarity when media mark embedding is not performed. Note that the difference in DSV in an MM pattern area causes a slight variation in DSV as a whole stream, which can be neglected.

Thereafter, the switch S(b) switches between the data channel bit stream of the main information, which passes through the delay unit 2828 and the channel bit of the media mark modulation signal (MM Code Word) (in other words, replacement with the media mark modulation signal is performed), to thereby generate a data channel bit stream.

OTHER EMBODIMENTS

Embodiments of the present invention can be expanded and modified without being limited to the above-described embodiments, and such expanded and modified embodiments are also included in the technical scope of the present invention.

What is claimed is:

1. A modulator, comprising:
a main information converter configured to first first-code-convert main information constituted of channel bits of a predetermined length by a first modulation method;
a specific information converter configured to second-code-convert specific information by a second modulation method different from the first modulation method;
a connection rule processing unit configured to third-code-convert the first-code-converted main information based on a connection rule table showing combinations of adjacent channel bits before and after the third-code-conversion;
a replacement unit configured to replace a part of the third-code-converted main information with the second-code-converted specific information; and
a direct-current component suppressing unit configured to suppress direct-current components of the replaced main information.

2. The modulator as set forth in claim 1,
wherein the main information is first-code-converted based on a main information conversion table showing channel bits of the main information before and after the first-code-conversion.

3. The modulator as set forth in claim 1,
wherein said connection rule processing unit does not third-code-converts a channel bit of the first-code-converted main information adjacent to a channel bit to be replaced with the specific information.

4. The modulator as set forth in claim 1, further comprising:
a connection rule inverting unit configured to return a channel bit of the third-code-converted main information to a state before the third-code-conversion, if the channel bit is adjacent to the channel bit replaced with the specific information.

5. A modulator, comprising:
a main information converter configured to first-code-convert main information constituted of channel bits of a predetermined length by a first modulation method based on state information defined by a channel bit immediately before a channel bit to be first-code-converted;
a specific information converter configured to second-code-convert specific information by a second modulation method different from the first modulation method;
a connection rule processing unit configured to third-code-convert the first-code-converted main information based on a connection rule table showing combinations of adjacent channel bits before and after the third-code-conversion;
a replacement unit configured to replace a part of the third-code-converted main information with the second-code-converted specific information; and
a direct-current component suppressing unit configured to suppress direct-current components of the replaced main information.

6. The modulator as set forth in claim 5,
wherein the main information is first-code-converted based on a main information conversion table showing channel bits of the main information before and after the first-code-conversion.

7. The modulator as set forth in claim 5,
wherein said connection rule processing unit does not third-code-converts a channel bit of the first-code-converted main information adjacent to a channel bit to be replaced with the specific information.

8. The modulator as set forth in claim 5, further comprising:
a connection rule inverting unit configured to return a channel bit of the third-code-converted main information to a state before the third-code-conversion, if the channel bit is adjacent to the channel bit replaced with the specific information.

9. A modulator, comprising:
a main information converter configured to first-code-convert main information constituted of channel bits of a predetermined length by a first modulation method, the main information including proprietary data being a subject of ownership and encoded contents;
a specific information converter configured to second-code-convert specific information by a second modulation method different from the first modulation method, the specific information being constituted a part of an encryption key for decoding the encoded contents;
a connection rule processing unit configured to third-code-convert the first-code-converted main information based on a connection rule table showing combinations of adjacent channel bits before and after the third-code-conversion;
a replacement unit configured to replace a part of the third-code-converted main information with the second-code-converted specific information; and
a direct-current component suppressing unit configured to suppress direct-current components of the replaced main information.

10. The modulator as set forth in claim 9,
wherein the main information is first-code-converted based on a main information conversion table showing channel bits of the main information before and after the first-code-conversion.

11. The modulator as set forth in claim 9,
wherein said connection rule processing unit does not third-code-converts a channel bit of the first-codeconverted main information adjacent to a channel bit to be replaced with the specific information.

12. The modulator as set forth in claim 9, further comprising:
a connection rule inverting unit configured to return a channel bit of the third-code-converted main information to a state before the third-code-conversion, if the channel bit is adjacent to the channel bit replaced with the specific information.

13. A modulation method comprising:
first-code-converting main information constituted of channel bits of a predetermined length by a first modulation method;
second-code-converting specific information by a second modulation method different from the first modulation method;
third-code-converting the first-code-converted main information based on a connection rule table showing combinations of adjacent channel bits before and after the third-code-conversion;
replacing a part of the third-code-converted main information with the second-code-converted specific information to output a channel bit stream; and
suppressing direct-current components of the replaced main information.

14. The method as set forth in claim 13 wherein the suppressing direct-current components includes calculating a digital sum value of the channel bits stream.

15. The method as set forth in claim 13,
wherein the main information is first-code-converted based on a main information conversion table showing channel bits of the main information before and after the first-code-conversion.

16. The method as set forth in claim 13,
wherein said third-code converting does not include code-converting a channel bit of the first-code-converted main information adjacent to a channel bit to be replaced with the specific information.

17. The method as set forth in claim 13, further comprising:
returning a channel bit of the third-code-converted main information to a state before the third-code-conversion, if the channel bit is adjacent to the channel bit replaced with the specific information.

* * * * *